United States Patent
Baluja et al.

(10) Patent No.: US 9,031,951 B1
(45) Date of Patent: May 12, 2015

(54) ASSOCIATING INTEREST AND DISINTEREST KEYWORDS WITH SIMILAR AND DISSIMILAR USERS

(75) Inventors: Shumeet Baluja, Leesburg, VA (US); Michele Covell, Palo Alto, CA (US); Rohan Seth, San Francisco, CA (US)

(73) Assignee: Google Inc., Mountain View, CA (US)

( * ) Notice: Subject to any disclaimer, the term of this patent is extended or adjusted under 35 U.S.C. 154(b) by 200 days.

(21) Appl. No.: 13/437,572

(22) Filed: Apr. 2, 2012

(51) Int. Cl.
*G06F 7/00* (2006.01)
*G06F 17/30* (2006.01)

(52) U.S. Cl.
CPC .............................. *G06F 17/30861* (2013.01)

(58) Field of Classification Search
USPC .......... 707/736, 737, 738, 748, 749, 802, 803
See application file for complete search history.

(56) References Cited

U.S. PATENT DOCUMENTS

| | | | |
|---|---|---|---|
| 7,853,622 B1 * | 12/2010 | Baluja et al. ................. | 707/803 |
| 2008/0209343 A1 | 8/2008 | Macadaan et al. | |
| 2008/0275861 A1 | 11/2008 | Baluja et al. | |
| 2009/0172172 A1 * | 7/2009 | Graham et al. ............... | 709/227 |
| 2011/0087678 A1 * | 4/2011 | Frieden et al. ................ | 707/749 |
| 2011/0302117 A1 | 12/2011 | Pinckney et al. | |

OTHER PUBLICATIONS

Joachims, T. (1998), "Text Categorization with Support Vector Machines: Learning with Many Relevant Features," Machine Learning: Proceedings / ECML-98 10th European Conference on Machine Learning, Chemnitz, Germany, pp. 137-142.
Sebastiani, F. (2002), "Machine Learning in Automated Text Categorization," ACM Computing Surveys, 34(1):1-47.
Yang, Y., et al. (1997), "A Comparative Study on Feature Selection in Text Categorization Source," Machine Learning: Proceedings / ICML-97 14th International Conference on Machine Learning, Nashville, TN, pp. 412-420.
Yu, Zhiwen et al., User Profile Merging Based on Total Distance Minimization, 2004, Toward a Human-Friendly Assistive Environment, vol. 14, pp. 25-32.

* cited by examiner

*Primary Examiner* — Hares Jami
(74) *Attorney, Agent, or Firm* — Fish & Richardson P.C.

(57) ABSTRACT

Methods, systems, and apparatus, including computer programs encoded on a computer-readable storage medium, including a method for propagating labels. The method comprises determining a set of labels to be associated with users of a social network, the labels including one or more designators for specifying areas of interest and areas of disinterest for a user. The method further comprises associating nodes in a graph representing the social network, where the users are represented by user nodes in the graph, and determining that a user is similar or dissimilar to another user in the social network. The method further comprises determining weights for the labels, each weight reflecting a magnitude of a contribution of an associated label to a characterization of the respective node, and propagating labels to other nodes that are related to the respective node by a relationship, including propagating labels in accordance with the determined similarity or dissimilarity.

60 Claims, 14 Drawing Sheets

ASSOCIATING INTEREST AND DISINTEREST KEYWORDS WITH SIMILAR AND DISSIMILAR USERS

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Social networks can permit users to post information about themselves and communicate with other people, such as their friends, family, and co-workers. Some social networks permit users to specify friendships with other users. Additionally, social network users may write descriptions of their interests and disinterests (e.g., what they like or don't like), compose stories, describe their lives, etc. Some users may generate a great amount of content, while other users may generate little or no content. User interests and disinterests can be determined implicitly, such as from user actions, e.g., web pages visited, ads clicked, etc.

SUMMARY

In general, one aspect of the subject matter described in this specification can be implemented in methods that include a method for propagating labels. The method comprises determining, by a computer system, a set of labels to be associated with users of a social network, the labels including one or more designators for specifying areas of interest and areas of disinterest for a user. The method further comprises associating, by the computer system, using the identified labels, nodes in a graph that represent the social network, where the users are represented by user nodes in the graph. The method further comprises determining that a user is similar or dissimilar to another user in the social network. The method further comprises determining, by the computer system for each respective node, weights for the labels, each weight reflecting a magnitude of a contribution of an associated label to a characterization of the respective node. The method further comprises propagating labels for a respective node to other nodes that are related to the respective node by a relationship including propagating labels in accordance with the determined similarity or dissimilarity.

These and other implementations can each optionally include one or more of the following features. The method can further comprise receiving an indication from the user of the similarity or dissimilarity. The indication can be determined automatically based on an overlap of interest or disinterest information between the user and another user. The interest and disinterest information can include one or more of user-stated preferences or words in user profiles. The method can further comprise using the overlap of interest or disinterest information to determine a connection weight between nodes, in the graph, representing the user and another user. The indication can be a similar indication, and propagating labels can include propagating areas of interest as being of interest to the user and areas of disinterest as being of disinterest to the user. The indication can be a dissimilar indication, and propagating labels can include propagating areas of interest as being of disinterest to the user and areas of disinterest as being of interest to the user. Propagating labels can further comprise normalizing the labels for one or both the areas of interest and the areas of dis-interest as a group. Identifying the set of labels can further comprise retrieving the labels from a profile associated with a user associated with a respective node. The method can further comprise implicitly assigning labels to users based on historical activities of the user. The method can further comprise assigning labels to users based on receipt of explicit designations of interest or dis-interest. Each designation of interest can be associated with a like action or the designation of disinterest can be associated with a dis-like action. Each designation of interest can be associated with an affirmation action or the designation of disinterest can be associated with a disaffirmation action. Labeling can include assigning labels based on an evaluation of content associated with a user. Labeling can include assigning labels based on a combination of explicit designations and implicit determinations. Implicit determinations can be made based on user interaction with content. The user interactions can be click-throughs. The method can further comprise determining a relative level of interest or disinterest that is associated with each label for a given user. The relative level of interest can be expressed in terms of a percentage. The relative level of interest can be normalized. Propagating the labels can include propagating the labels to a neighbor node based at least in part on the assigned weights and types of connections between respective nodes. The type of relationship can be selected as being one of similar or dissimilar. The indication can include a measure of similarity. The measure of similarity can include a degree of similarity between a user and a connected other user represented by an adjoining node. Propagating the labels can include determining a label weight to propagate for each label to an adjoining node based at least in part on an assigned weight of a respective label and a weight associated with a connection to the adjoining node. Identifying a set of labels can include identifying one or more groups that a user is included in, and identifying can include identifying one or more labels associated with a respective group and assigning the one or more labels to each member of the respective group. Assigning weights can further comprise determining a predicted distribution of magnitudes of weights assigned across a group of users and adjusting magnitudes for labels of one or more users nodes based at least in part on a comparison to the predicted distribution. Assigning weights can further comprise determining a confidence factor for each weight and propagating can include adjusting weights propagated for a label based at least in part on the confidence factor. The method can further comprise targeting content to respective users based at least in part on the assigned labels and weights. The labels can be keywords. The labels can be uncommon keywords associated with a user. Each node can be connected to less than all of the other user nodes that a user has a relationship with. The edges that connect the user nodes can be weighted based on one or more of a user's explicit designation of a relative weighting between relationships, two user's mutual explicit designation of affirmation of a relationship; or a measure of degree of relatedness of a node to other nodes in the graph. The user can represent a group of users. The labels can be advertisements. A respective user may have indicated either an interest or dis-interest in content associated with a respective advertisement. The graph can include one or more uncharacterized label nodes that are used to reduce an effect of faraway nodes on a respective node. Normalizing can include linearly weighting magnitudes of labels for a user node and scaling them to a scale of 1.0. The relationship can be a social relationship. The relationship can be a friendship specified by a user represented by a respective node. The relationship can be selected from a group consisting of a relationship based on group membership specified by a user represented by a respective node, a relationship based on similarity between content generated by the users represented by the respective node and the neighboring nodes, and a relationship based on similarity of a web-site visiting pattern. The user nodes representing the users of the social network can comprise group nodes representing groups of users and individual user nodes representing individual users. The method can further comprise generating the graph that includes the nodes and expresses relationships between the nodes as edges connecting the nodes. The edges can be weighted based on factors selected from a group consisting of whether the relationships are bi-directional, a number of links between the nodes, a frequency that a user visits another user's profile, and payment terms specified by advertisers. The method can further comprise outputting, for each respective node, weights for the user labels based on weights of user labels associated with neighboring nodes, which are related to the respective node by a relationship. The method can further comprise determining a node's weight for a label by selecting each neighboring node and adding the weights of the neighboring nodes' labels to the node's weight for the label. The label weight of the neighboring node's label can be at least partially based on a relationship relating a node to the node's neighbors.

In general, another aspect of the subject matter described in this specification can be implemented in methods that include a method for propagating weights. The method comprises identifying one or more labels of interest to be associated with users of a user group. The method further comprises classifying each user including determining an association between the one or more labels and each respective user where the labels include areas of interest and areas of dis-interest as either explicitly or implicitly determined for a given user. The method further comprises providing a first graph of the user group that includes a plurality of nodes, one node for each user and one or more label nodes that inject weights for the labels into each respective user node, including providing edges between user nodes that represent relationships between the users and assigning labels to each user based on the classifying. The method further comprises determining weights for each label for each user node in the first graph. The method further comprises determining that a user is similar or dissimilar to another user in the social network. The method further comprises propagating the weights to one or more neighbor nodes connected to a respective user node based at least in part on the determined similarity or dissimilarity.

These and other implementations can each optionally include one or more of the following features. The method can further comprise receiving an indication from the user of the similarity or dissimilarity. The indication can be determined automatically based on an overlap of interest or disinterest information between the user and another user. The interest and disinterest information can include one or more of user-stated preferences or words in user profiles. The method can further comprise using the overlap of interest or disinterest information to determine a connection weight between nodes, in the graph, representing the user and another user. The indication can be a similar indication, and propagating labels can include propagating areas of interest as being of interest to the user and areas of disinterest as being of disinterest to the user. The indication can be a dissimilar indication, and propagating labels can include propagating areas of interest as being of disinterest to the user and areas of disinterest as being of interest to the user. The method can further comprise normalizing the weights including normalizing the weights as a group including labels associated with areas of interest and areas of dis-interest to the user, and propagating the weights can further comprise propagating the weights based at least in part on the normalized weights. The method can further comprise providing a second different graph of the user group that includes a plurality of nodes, one for each user and one for each label, including providing edges between nodes that represent an association of a label with a respective user, and determining weights for each label for each user node in the second different graph. The method can further comprise applying an algorithm iteratively to the first and/or second graphs to determine the weights. The method can further comprise performing a random walk from each node for which labels are to be weighted including performing a tally of labels found on the walk and associating the tallied labels in proportion based at least in part on the tally.

In general, another aspect of the subject matter described in this specification can be implemented in systems that include a system for propagating interest and disinterest labels among users. The system comprises a data structure generator for creating a graph that represents a social network, the graph including labels and user nodes associated with users of a social network system, the labels including one or more designators for specifying areas of interest and areas of disinterest for a respective user. The system further comprises a classification module for associating the labels with the user nodes, the labels including weights, where each weight reflects a magnitude of a contribution of an associated label to a characterization of the respective node. The system further comprises a node relationship/association module for joining user nodes with edges based on relationships among users, including bi-directional or uni-directional edges depending on types of relationships, including similarity and dissimilarity. The system further comprises a label weight modifier module for modifying label weights associated with user nodes during propagation of label weights among user nodes, including propagation of labels for a respective node to other nodes that are related to the respective node by a relationship, and normalizing the labels for both the areas of interest and the areas of disinterest as a group.

In general, another aspect of the subject matter described in this specification can be implemented in computer program products that include a computer program product tangibly embodied in a computer-readable storage device and comprising instructions. The instructions, when executed by a processor, cause the processor to: identify a set of labels to be associated with users of a social network including one or more designators for specifying areas of interest and areas of disinterest for a respective user; label nodes comprising the user nodes with the labels; determine that a user is similar or dissimilar to another user in the social network; assigning for each respective node, weights for the labels, the weights reflecting a magnitude of a contribution of an associated label to a characterization of the respective node; and propagating labels for a respective node to other nodes that are related to the respective node by a relationship including propagating labels in accordance with the determined similarity or dissimilarity.

In general, another aspect of the subject matter described in this specification can be implemented in computer program products that include a computer program product tangibly embodied in a computer-readable storage device and comprising instructions. The instructions, when executed by a processor, cause the processor to: identify one or more labels of interest to be associated with users of a user group; classify each user including determining an association between the one or more labels and each respective user where the labels include areas of interest and areas of dis-interest as either explicitly or implicitly determined for a given user; provide a first graph of the user group that includes a plurality of nodes, one node for each user and one or more label nodes that inject weights for the labels into each respective user node, including providing edges between user nodes that represent relationships between the users and assigning labels to each user based on the classifying; determine weights for each label for each user node in the first graph; determine that a user is similar or dissimilar to another user in the social network; and propagate the weights to one or more neighbor nodes connected to a respective user node based at least in part on the determined similarity or dissimilarity.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
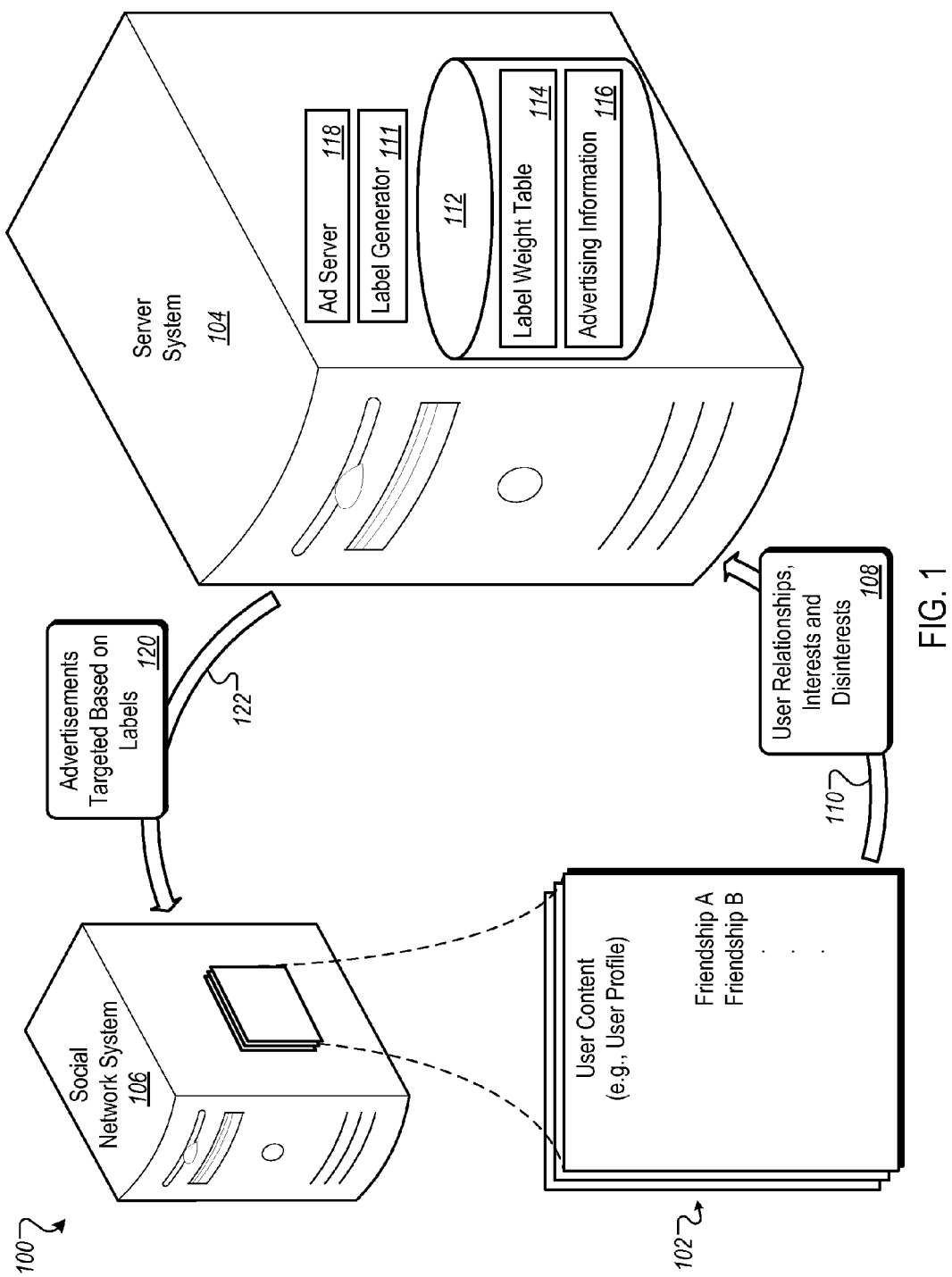
FIG. 1 is a schematic of an example system for determining label information.

This document describes systems and techniques for determining labels based on users' interests and disinterests. Social networks can host information about, and generated by, the social networks' users. For example, as seen in FIG. 1, users can create user content 102 (e.g., user profiles), which can include interests and disinterests, stories, facts or descriptions about a user. In some implementations, user interests and disinterests can be determined from what the user likes or dislikes, content on which the user performs an affirmation (e.g., plus one) or a disaffirmation (e.g., minus one) action, or any other user-specified preference or user-performed action related to interests and disinterests. Additionally, the users can specify social relationships with other users. For example, a user can specify other users that are "friends." In another example, a user can specify that they are similar or dissimilar to another user.

Content delivery systems, such as server system 104 of FIG. 1, can target online content (e.g., advertisements or "ads") to persons based on their interests and/or disinterests, e.g., determined from the content of their user profiles hosted on the social network. For example, labels can be associated with a user, and the labels can be used in targeting content (e.g., ads) to that user. In some situations, a user may not provide enough (or any) information (e.g., in the user profile), or the user's interests/disinterests may not be known, which may make it difficult to generate online ads that are accurately targeted to the user. In general, content delivery systems can select content that corresponds to a user's interests, while avoiding selecting content that corresponds to a user's disinterests. Advertising systems are just one example type of content provider which can target content using labels based on user interests and disinterests.

Labels can be associated with (or assigned to) a user in various ways. For example, labels can be assigned based on an evaluation of content associated with a user, including the user's likes/dislikes, web pages visited by the user, the user's location, demographic information for the user, and so on. Labels can be assigned based on a combination of explicit designations (e.g. information supplied by the user) and implicit determinations (e.g., labels inferred for the user). Implicit determinations can be based on user interaction with content, such as click-throughs, conversions, etc. Labels associated with each user can also reflect a relative level of interest or disinterest, such as by using percentages. For example, percentages ranging from 1%-30% can designate a low interest, 31%-70% can designate a moderate interest, and 71%-100% can designate a high interest. Such percentages, when used in examples in this disclosure, can be represented as decimal values or weights (e.g., 0.5=50%).

In the situation where a first user's interests and disinterests are not known (e.g., the first user lacks information in his profile), interests and disinterests of other users that are related to the first user can be used for targeting content to the user. In some implementations, labels associated with a user's friends can be propagated to the user, and the propagated labels can be used to target content. For example, a first user Isaac may not have any information in his profile except that he has two friends, Jacob and Esau. The server system 104 can use information from Jacob's and Esau's profiles and/or other interest/disinterest information to infer information for Isaac's interests/disinterests. For example, the inferred information can be used to generate online ads that are displayed when Isaac's profile is viewed. Targeting can occur regardless of whether the interests and/or disinterests are explicitly determined for the user, or are implicitly determined, such as by user actions or by propagating labels (and interests/disinterests) from other users. Finally, in situations in which user A has indicated that they are dissimilar to user B, user B's interests can be propagated to user A as disinterests, and user B's disinterests can be propagated to user A as interests.

In some implementations, labels can be propagated to user groups, e.g., user networks or user circles. For example, a label that is propagated to a user group can be propagated to each user in the user group, or to the user group itself, or a combination of both.

In some implementations, when a label is propagated from node A to node B, as used in this disclosure, it means that, if node B already has that label, then node B's label weight is updated based on the value of the node A's label weight for the same label. If node B does not already have that label, then the label is created for node B and is assigned a label weight that is based on the value of node A's label weight for that label.

In some implementations, profiles for social network users may include terms or colloquialisms that do not correspond to keywords that advertisers use to target their campaigns. These terms or colloquialisms can be mapped to keywords that are used by advertisers by inferring associations between the terms or colloquialisms (collectively referred to as non-advertising keywords) and the keywords.

In some implementations, the inferred associations between the non-advertising keywords and the advertising keywords can be based on social relationships specified in user profiles. For example, Jacob may include terms in his profile, such as "hax0r" (i.e., hacker) and "btcn" (i.e., better than Chuck Norris) that do not correspond to advertising keywords. Jacob's profile specifies that Leah and Rachel are friends. Both Leah and Rachel include terms in their profile, such as "Ajax" (i.e., asynchronous JavaScript and XML) and Perl (Practical Extraction and Reporting Language) that do correspond to advertising keywords. A content delivery system, such as the server system 104, can be used to generate associations between Leah and Rachel's terms and Jacob's terms so that content targeted for Leah and Rachel based on the keywords in their profile can also be used to target content for Jacob because an association is inferred between Jacob's profile and terms in Leah and Rachel's profiles.

In some implementations, user interests and disinterests can be determined implicitly based on user activity. As an example, a user's search logs or search history can be used to determine which web pages the user has visited. If, for example, web histories for the user indicate that the user spent a significant amount of time on sports-related websites, then an implicit determination can be made that the user is interested in sports. Further, the relative number of sports-related websites visited and/or the relative amount of time that the user spent on the web sites can indicate the degree of interest of the user. Conversely, by not visiting politically-related websites, or by quickly clicking away from such web sites, an implicit determination can be made that the user is disinterested in politics. Search logs and search histories can be anonymized so that the privacy of users is protected. For example, quasi-unique identifiers can be associated with users, but the actual identifying information of the users is not stored in the search logs. Additionally, any identified user preferences or user interactions can be generalized (for example, generalized based on user demographics) rather than associated with a particular user. Encryption and obfuscation techniques can also be used to protect the privacy of users.

FIG. 1 is a schematic of an example system 100 for determining label information. Specifically, the label information can include content-targeting labels for a first social network user that is determined based on label information of another user who is socially related to (e.g., a friend of) the first social network user. In some implementations, the system includes a social network system 106 and the server system 104 discussed previously, which can, for example, determine associations between content in individual users' profiles based on social relationships specified by the profiles.

In some implementations, the social network system 106 includes the user content 102, which can include user-generated content, such as user interests and disinterests, user blogs, postings by the user on the user's profile or other users' profiles (e.g., comments in a commentary section of a web page), a user's selection of hosted audio, images, and other files, and demographic information about the user, such as age, gender, address, etc.

Additionally, the user content 102 can include social relationships that specify associations between users of the social network system 106. For example, a user Joshua may list Aaron and Caleb as friends, and Joshua may be a member of the Trumpet Player Society, which includes Izzy as a second member. The specified friendship and group membership relationships can be used to infer a similarity in user interests among the users Joshua, Aaron, Caleb, and Izzy.

Information, or content 108, of the user content 102 can be transmitted to the server system 104, as indicated by an arrow 110. The server system 104 can use a label generator 111 to create labels for users for which interests and disinterests are not well known (e.g., users having incomplete or sparsely populated user profiles) based on content associated with related users (e.g., profiles of friends or members of the same group, clubs, society, etc.).

In some implementations, the labels can include keywords associated with the profiles. For example, a label may be a keyword (e.g., "cars") that is included in a web page profile. In some implementations, the labels may be categories associated with content in a profile, for example, a profile can include content describing Corvettes, Vipers, and Hugos. A label applied to the profile may be "cars" based on predetermined associations between the Corvette, Viper, and Hugo terms and the category "cars."

In the implementation shown in FIG. 1, the server system 104 includes a data store 112, where information about the labels can be stored. In some implementations, each user profile may be associated with more than one label. The associations between each profile and corresponding labels can be stored in a data structure, such as a label weight table 114.

In some implementations, the label weight table 114 can also include label weights that indicate a possible interest or disinterest level for each label. For example, Adam's profile can include content about gardening and animal husbandry, but twice as much content may be focused on gardening. The label weight table 114 can include an interest label weigh of 0.66 for gardening and 0.33 for animal husbandry under Adam's profile entry, which indicates the profile includes twice as much information on gardening as animal husbandry.

The data store 112 can also include advertising information 116 used to generate online advertisements (ads) 120 directed to profiles hosted by the social network system 106. The online advertisements 120 can be transmitted by an ad server 118 hosted by the server system 104. The ad server 118 can use the label information in the label weight table 114 to generate online ads 120 that are targeted for user profiles based on labels associated with the user profiles. For example, the server system 104 can transmit, as indicated by arrow 122, the target ads 120 to the social network system 106 for display with the user profiles or to the users associated with the user profiles. While reference is made to targeting and serving ads, other forms of sponsored content can be served.

Figure 2:
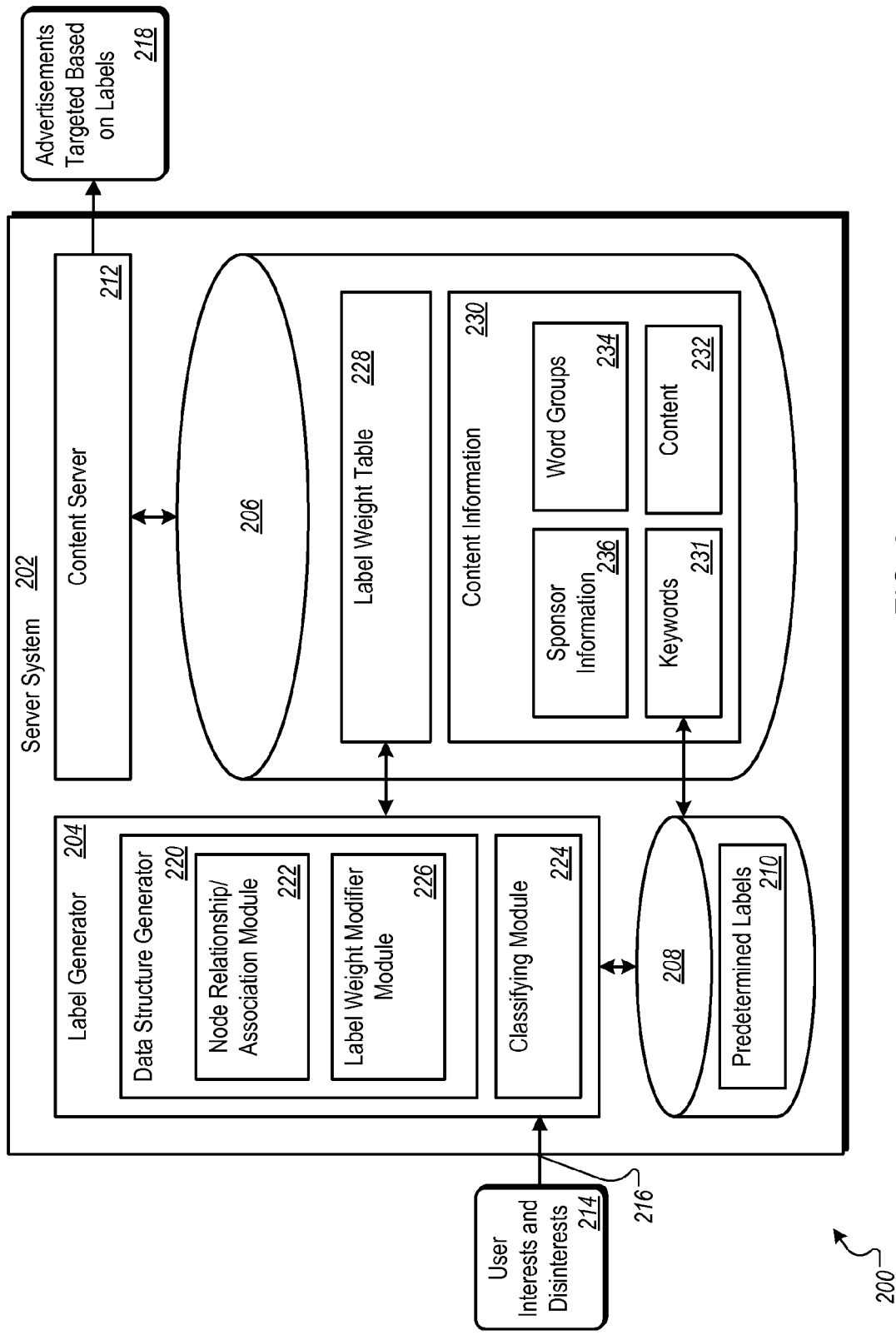
FIG. 2 is a box diagram of an example system that determines labels for users of a social network system.

FIG. 2 is a diagram of an example system 200 that shows a server system 202 and infers labels for user profiles hosted by a social network system. The server system 202 includes a label generator 204, a first data store 206 that includes label and content information, a second data store 208 that includes predetermined labels 210, and a content server 212.

In some implementations, the server system 202 can receive content 214, e.g., including user interests and disinterests from user profiles of a social network system, as indicated by arrow 216. The server system can use the content 214 to identify or generate labels based on the content 214, where the labels can be used to generate or identify online content items (e.g., ads 218) that are targeted to corresponding users or user profiles.

In some implementations, the label generator 204 includes a data structure generator 220 that can create a data structure used to infer the labels. In some implementations, the data structure generator 220 can generate a graph, where each user is represented by a node in the graph. However, the graph data structure is just one of several data structures or mechanisms that can be used to represent users and infer labels. As such, no physical graph need be drawn in order to infer labels among users. In some implementations, multiple graphs can be used. The examples that follow use graphs that include nodes that represent users, but other data structures can be used.

The data structure generator 220 can include a node relationship/association module 222 that links the nodes with edges based on social relationships specified by the user. For example, a user Adam may specify in his profile that Seth is a friend. The node relationship/association module 222 can join the user nodes for Adam and Seth with an edge. The edges may be bi-directional or uni-directional; however for the purposes of clarity, the edges in the following examples are bi-directional unless otherwise specified.

The label generator 204 also includes a classification module 224, which can associate users of the social network system with labels, such as the predetermined labels 210 in the second data store 208. For example, the classification module 224 can use text analysis techniques, such as those described in "A Comparative Study on Feature Selection in Text Categorization Source," Yang, Yiming and Pedersen, Jan O., Proceedings of the Fourteenth International Conference on Machine Learning, pages 412-420; "Machine learning in automated text categorization," Sebastiani, Fabrizio, ACM Computing Surveys (CSUR) archive, Volume 34, Issue 1 (March, 2002), pages 1-47; and "Text Categorization with Support Vector Machines: Learning with Many Relevant Features," Joachims, Thorsten, Lecture Notes In Computer Science, Vol. 1398 archive, Proceedings of the 10th European Conference on Machine Learning, pages: 137-142; the entirety of each is incorporated by reference here. Text analysis can be used to determine labels to associate with user nodes in a generated graph. The subject of the analysis can include user profiles, comments posted by a user, descriptions of groups to which a user belongs, etc. In some implementations, the predetermined labels 210 can be based on keywords 231, which are submitted by content sponsors (e.g., advertisers). For example, the keywords 231 can include the term "furniture." This can be used as a predetermined label, which the classifying module 224 associates with users that have profiles that include the term "furniture." Additionally, the classifying module can associate the users with the label "furniture" if the user profiles include words that are associated with "furniture," such as chair, table, or home decorating.

In some implementations, the label generator 220 also includes a label weight modifier module 226. The label weight modifier module 226 can modify label weights associated with users using methods and structures more fully described below. For example, modifications to the weights can occur during propagation of label weights among users, as described below.

Initial and modified label weights can, in some implementations, be stored in a data structure, such as a label weight table 228 of the first data store 206. For example, the label weight table 228 can include label weights for interest and disinterest labels associated with users, groups of users, or other associations.

The content server 212 can use information 230 stored in the first data store to generate or select electronic content items that are based on the label or label weights associated with each user. The information 230 can include, for example, keywords 231 that a content sponsor selected to associate with their content 232. The information 230 can also include word groups 234 (also referred to as ad groups), which are categories that include related keywords and are associated with content to display when one of the keywords corresponds to a user's interests, e.g., occurs in the user's profile. Additionally, the information 230 can include information 236 about the content sponsors, such as an identifier, payment information, bidding price, etc.

Figure 3:
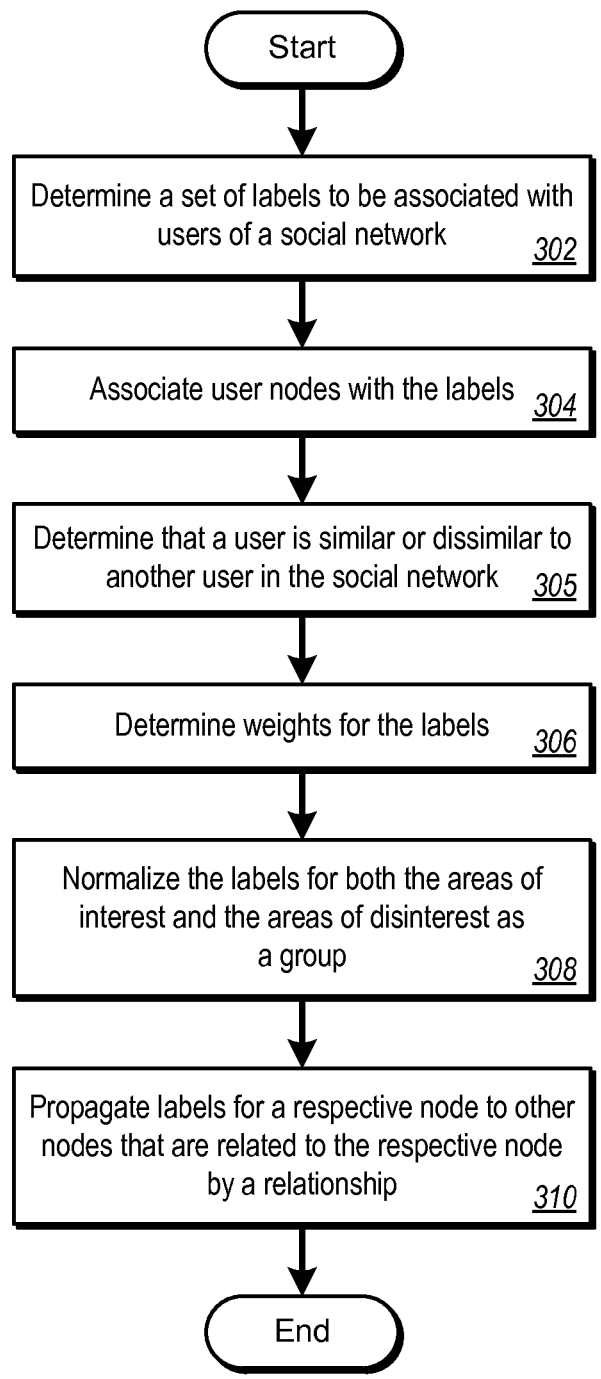
FIG. 3 is a flow chart of an example method for propagating labels.

FIG. 3 is a flow chart of an example method 300 for propagating interest and disinterest labels among user nodes. In some implementations, the method 300 includes steps that can be implemented as instructions and executed by a processor in a computer system, e.g., in the server system 202.

The method 300 can begin with step 302, where a set of labels determined. The labels are to be associated with users of a social network. For example, the classifying module 224 can identify the labels using the user interest and disinterests 214. The users are represented by nodes in a graph that represents the social network. For example, the data structure generator 220 can create a graph that represents the social network, where each user is represented by a node in the graph, and edges in the graph represent social connections (e.g., friendships) between users. The labels include one or more designators for areas of interest, and areas of disinterest, for a user. For example, labels can include both categories of interest (e.g., Music, Dogs, Movies, Business, etc.) and keywords (Music Star A, Tables, Masks, etc.). In some implementations, either categories or keywords are selected as labels. Also, a subset of categories or keywords can be selected from the superset to use as labels. In some implementations, a user may input and/or select particular keywords using a user interface associated with the label generator 204. For example, user selection can specify that the label generator 204 should use the categories such as Opera, Racing, Politics, Religion, Stocks, Music, Cats and Dogs as keywords.

In step 304, labels selected in step 302 are used to associate user nodes with the labels. For example, the classifying module 224 can classify each user with defined labels, e.g., based on information in their user profile or other content that the user has created. In some implementations, the classifying module 224 can use text-classification machine learning algorithms to accomplish the classifications. In some implementations, a user can be classified using more than one label. Additionally, in some implementations, if a user's profile does not have enough information to classify the user with labels, the user is left unclassified. The labels used to label user nodes in this step can include labels for user interests and disinterests. In some implementations, using the labels classified to users, the data structure generator 220 can label user nodes in a graph that represents the users in a social network, as described below.

Although not shown in method 300, in some implementations, if the social network system includes any user groups such as clubs, societies, classes, etc., the classifying module 224 can attempt to categorize the groups based on text and other content that describes the group or is associated with the group, such as message boards for the group. The classifying module 224 can classify the groups in a substantially similar way as the user classification is accomplished.

In step 305, it is determined that a user is similar or dissimilar to another user in the social network. For example, dissimilarity information can be available after a first user (e.g., Dave) uses an interface in a social networking application to specify that he is dissimilar to a second user (e.g., Fran). The specification can occur, for example, even though Dave and Fran are connected in the user network (e.g., as "friends"). In some implementations, automatic processes can determine that two users are dissimilar, e.g., if a determination is made that Dave and Fran have different interests, e.g., based on what web pages they visit and/or other information.

In some implementations, the type of relationship between two users can be one of being similar or dissimilar. For example, most users in a social group can be designated as being similar, while the relationship between Fran and Dave can be a relationship of dissimilarity.

In some implementations, the indication of a relationship between two users can include a measure of similarity. For example, Fran and Bart can be very similar and, as a result, a similarity measure such as a similarity score can have a higher value than two users who are only moderately similar. Similarity scores can also be used to indicate dissimilarity, e.g., where a very low similarity score can indicate that two users (e.g., Fran and Dave) are not at all similar.

In some implementations, while one user in a pair of users may provide an indication that they are dissimilar, the other user may indicate the opposite. For example, Dave may indicate that he is not at all similar to Fran, while at the same time Fran may indicate that she is very similar to Dave.

In some implementations, the measure of similarity can include a degree of similarity between a user and a connected other user represented by the adjoining node. For example, the degree of similarity between Dave and Fran can be low (e.g., according to Dave).

In some implementations, similarities and dissimilarities between users, and the degree to which they are similar or dissimilar, can be used to propagate labels between users. For example, similar users can propagate labels as likes, and dissimilar users can propagate labels as dislikes.

In step 306, weights are determined for the labels of each respective node. Each weight reflects a magnitude of a contribution of an associated label to a characterization of the respective node. For example, for any particular user node, there can be several labels which correspond to a user's interest (e.g., an interest in content associated with the label). The user's profile, for example, may indicate that the user has a strong interest in Cats and a small interest in Dogs. As a result, the classifying module 224, for example, can assign a weight of a greater magnitude to the Cats label, and a weight of a lesser magnitude to the Dogs label. These weights can be added (e.g., by the data structure generator 220) to the labels in the node of the graph.

In some implementations, label nodes having multiple label weights for different labels are also associated with user nodes. These label nodes can "inject" label weights into the user node (e.g., see FIG. 4C). This is described in more detail in association with FIG. 4C.

Additionally, in some implementations, the label generator 204 generates a second data structure, such as a second graph. For example, the second graph can also include nodes substantially similar to the first graph, except that each user can be associated with one or more label nodes that reflect a single subject of interest (e.g., see FIG. 7).

In step 308, the label weights are normalized. The normalization occurs for all of the weights in a group that includes both the areas of interest and the areas of disinterest for a particular user. For example, the label generator 204 can normalize the label weights to weights between a 0 and 1, where the each weight reflects the label weight's contribution relative to the other label weights' contributions. In some implementations, the normalized weights of the interest labels and disinterest labels, as a combined group, can sum to 1.0. For example, if the pre-normalized label weights for a user node include a 0.75 interest weight for Religion, a 0.25 interest weight for Music, a 1.0 disinterest weight for Stocks, and a 0.5 disinterest weight for Cats, then the normalized weights are 0.3, 0.1, 0.4 and 0.2, respectively.

In step 310, labels and/or label weights for a respective node are propagated to other nodes that are related to the respective node by a relationship. For example, the label generator 204 and/or the label weight modifier module 226 can determine, for a selected user node, the neighboring user nodes (e.g., representing the user's friends) that are linked to the selected user node, e.g., with edge connections on the graph. Then, the label weights in the neighboring user nodes can be used to generate a new label (e.g., if the label has not been assigned to the user node) or modified label weight for the selected user node. The weights that are determined or modified can depend on whether (and to the extent that) the users are similar or dissimilar. For example, labels of similar users can be propagated as likes, and labels of dissimilar users can be propagated as dislikes. Step 310 can be repeated for all user nodes in the graph. Further, the step can be repeated several times until, for example, until the label weights at the user nodes stop changing significantly. Other indicators can be used to control when the repetitions of the step can stop, including, for example, the number of iterations of propagation.

In some implementations, steps 306-310 can also be performed on the second graph described in association with step 306. The label generator 204 can select and compare the resulting label weights magnitudes for a corresponding user node from both the first and second graphs. In some implementations, the label generator 204 can combine the label weight magnitudes from each graph through linear weighting to determine a final label weight magnitude (e.g., the first graph's label weight contributes 0.7 and the second graph's label weight contributes 0.3). In some implementations, the weights can be weighed equally to determine the final label weight (e.g., 0.5, 0.5), or the label generator 204 can give one weight its full contribution while ignoring the weight from the other graph (e.g., [1.0, 0.0] or [0.0, 1.0]).

In some implementations, the label generator 204 can use a cross-validation method to set the contribution weights for label weight magnitudes from each graph. For example, the label generator 204 can access user nodes in a graph, where the user nodes have label weight magnitudes that are known. The label generator 204 can compare the actual label weight magnitudes with the known label weight magnitudes. The label generator 204 can then weight each graph based on how closely its weights match the known label weights.

In some implementations, the label generator 204 can compare the label weight magnitudes to an expected a priori distribution, instead of (or in addition to) examining the final label magnitudes. For example, if a summed weight of label_A across all label nodes is 8.0 and the weight of label_B across all of the label nodes is 4.0, then the a priori distribution suggests that label_A may be twice as likely to occur as label_B. The label generator 204 can use this expectation to calibrate the label weight magnitudes for each user node. If in node_n, label_A weight is 1.5 and label_B weight is 1.0, then the evidence for label_A, although higher than label_B, is not as high as expected because the ratio is not as high as the a priori distribution. This decreases the confidence that the difference in magnitudes is meaningful. A confidence factor can be translated back into the weights.

In some implementations, if the difference in magnitudes is below a confidence threshold, then the label generator 204 can increase the weight for a label having a lower-than-expected weight. For example, if label_A's weight is expected to be three times the weight of label_B, but was only 1.1 times greater than label_B, then the label generator 204 can assign label_B a higher weight, e.g., in proportion to the expected weight. In some implementations, the confidence factor can be kept as a confidence measure, which can be used, for example, by machine learning algorithms to weight the resultant label weight magnitudes.

In some implementations, instead of (or in addition to) comparing the label weight magnitudes based on the a priori distribution of the label nodes, the label generator 204 can compare the label weight magnitudes based on an end distribution of magnitudes across all nodes. For example, the label generator 204 can measure how different a particular node's distribution is from an average, as calculated across all nodes in a graph.

Given the labels generated by the label generator 204, in some implementations, the content server 212 can use the labels to select content (e.g., ads) to display. For example, if a user node is associated with the label Music Star A, the content server 212 can select music content to display with a user profile associated with the user node. In another example, if the label is Religion, then the content server 212 can select content that is determined to be religious or content that a sponsor specified to be displayed based on an occurrence of terms relating to religion.

In some implementations, other factors can influence whether certain content is displayed based on the labels. For example, the content server 212 can factor in how much a sponsor is willing to pay for display of the content, such as the cost per impression/click/transaction/etc., to determine whether to display a content item and which content item to display.

Figure 4A:
FIGS. 4A-4D show exemplary information used for generating labels for users and groups of users.
Figure 4B:

FIGS. 4A and 4B show example information used for labeling users and groups of users based on the users' interests and disinterests. Table 400 shown in FIG. 4A includes information about users of a social network. Table 400 has five columns, which include member identifiers 402, friends identifiers 404 that specify each user's friends, initial interest labels 406 that specify each user's interests, initial disinterest labels 407 that specify each user's disinterests, and group identifiers 408 that specify groups with which each user is associated. Labels 406 and 408 can be determined in various ways, either explicitly or implicitly, such as being generated based on user-provided content (e.g., on a user profile page), determined explicitly from the actions of the users (e.g., content that the user accesses or avoids), and so on. Further, labels 406 and 408 also have an associated weight that provides a relative indication of the user's interest or disinterest. For example, the user Fran has a 0.2 weight interest in dogs and a 0.8 weight interest in cats, and the user Emma has a 1.0 weight disinterest in stocks and a 0.5 weight disinterest in cats.

FIG. 4B shows an example table 410 that includes group identifiers 412 for groups in the social network system, group interest labels 414, and group disinterest labels 415. For example, interests and disinterests can be generated based on content from the group's profile page on the social network. In certain implementations, the labels 414 and 415 may be generated and stored in the table 410 by the classifying module 224 using textual analysis techniques as described previously. In this example, the names of the group identifiers 412 in the table 410 correspond to the group identifiers 408 in the table 400, meaning that the users associated with those groups inherit interests and disinterests that correspond to the groups.

Figure 4C:
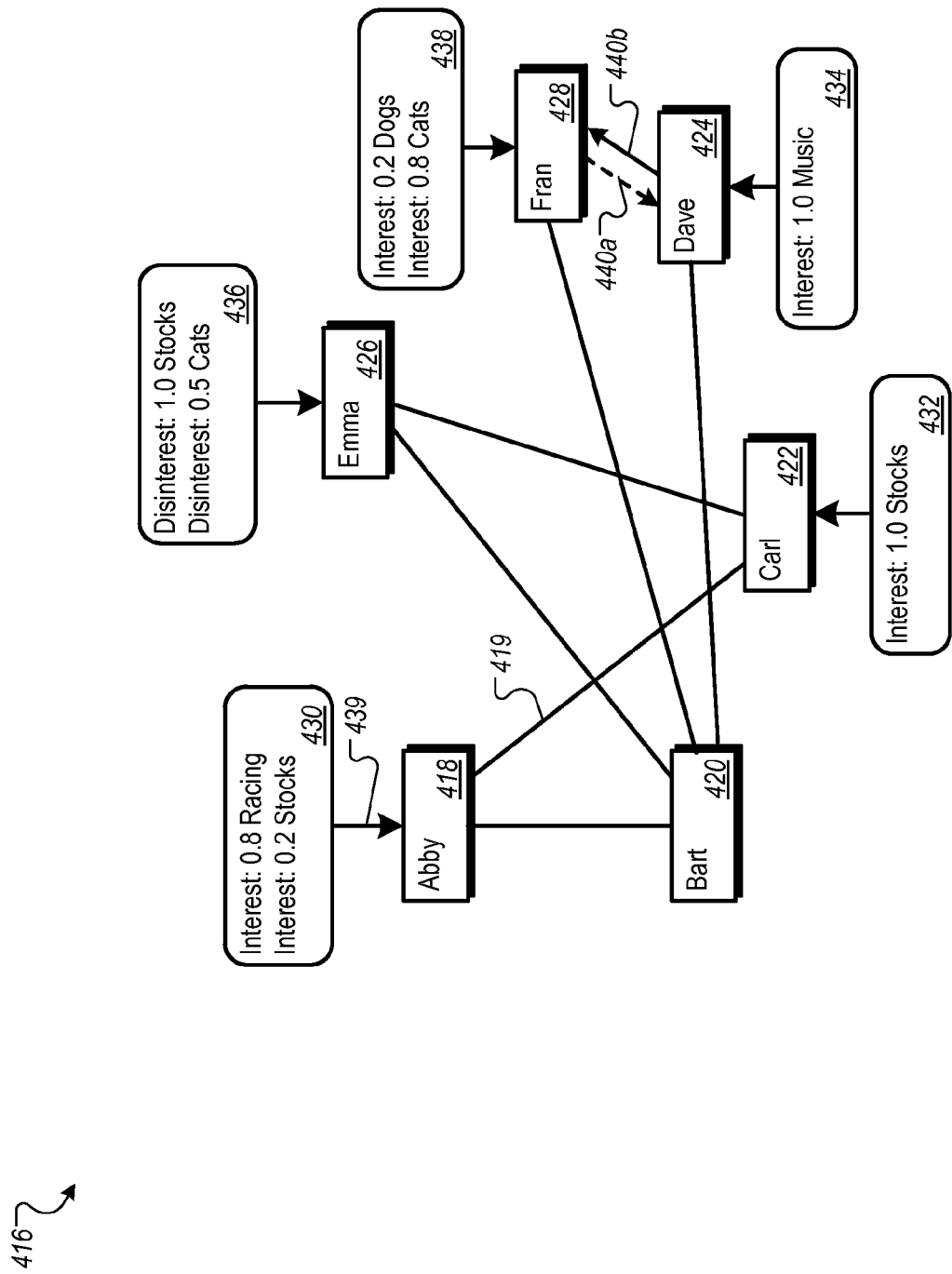

This information can also be represented by a graph data structure 416 as shown in FIG. 4C. Each of the users in a social network can be represented as nodes in the graph. For example, Abby, Bart, Carl, Dave, Emma and Fran are represented by nodes 418, 420, 422, 424, 426 and 428 respectively. For simplicity of explanation, the graph data structure 416 does not explicitly show nodes associated with groups, such as the Web Agnostics and Young Web Democrats groups included in the table 410 of FIG. 4B. However, interests and disinterests associated with the groups are associated with the members of the groups. This is described in more detail below.

In some implementations, the user nodes are linked by edges based on social relationships specified by the users. For example, Abby node 418 is linked by edge 419 to Carl node 422 because, for example, Abby has specified that Carl is a friend (e.g., on her profile page). FIG. 4C also shows label nodes 430-438 that associate user nodes with labels having weights that reflect a probable interest or disinterest of the user. In some implementations, the interest and disinterest weights in the label nodes may not change based on the interest and disinterest weights for labels of neighboring nodes. This is illustrated in this figure by the uni-directional edge 439.

For example, Abby node 418 is associated with label node 430 having interest weights 1.8 for the Racing label, 0.2 for Stocks, 0.9 for Politics, and 0.1 Religion, which reflect how much each label should contribute to the user node. The label Racing specifies that Abby is interested in Racing based, for example, on information in Abby's profile. Abby's interest and/or disinterest can be determined explicitly or implicitly from various sources, such as Abby's profile page where Abby can indicate an interest weight for racing of 0.8. The interest weight for Racing in the label node 430 is increased to 1.8 because Abby is a member of the NASCAR group (e.g., having an interest weight of 1.0), which is also associated with the label Racing. The label node 430 also includes an interest weight 0.2 for Stocks because of the 0.2 weight for Stocks for Abby in the initial interests column 406 in the table 400. Other interest weights for Abby include 0.9 for Politics and 0.1 for Religion, as determined from the group Young Web Democrats and the interest weights listed in the table 410. Further, a disinterest weight of 1.0 for Opera originates from the NASCAR group to which Abby is associated.

Carl node 422 is associated with a label node 432, which specifies that Carl has interests in Stocks (interest weight 1.0), Religion (interest weight 0.75) and Music (interest weight 0.25). The interest weight's for Carl's interest in Religion and Music are based on Carl's membership in the Web Agnostics group.

The label node 434 is associated with Dave node 424 and specifies that Dave is interested in Music (interest weight 1.25), Politics (interest weight 0.90) and Religion (interest weight 0.85). In this example, Dave's Music interest weight is the sum of Dave's 1.0 interest weight and the 0.25 interest weight from the Web Agnostics group of which Dave is a member. Dave's Politics interest weight 0.90 is also based on his membership in the Web Agnostics group. Dave's Religion interest weight 0.85 is a sum of the 0.75 and 0.10 interest weights of the Web Agnostics group and the Young Web Democrats, respectively.

Emma node 426 is associated with the label node 436. The disinterest weights of 1.0 for Stocks and 0.5 for cats are based on disinterests unique to Emma, e.g., from Emma's user profile. Emma's interest weights of 0.75 for Religion and 0.25 for Music are based on Emma's membership in the Web Agnostics group.

Fran node 428 is associated with the label node 438. Fran's interests include Dogs (interest weight 0.2) and Cats (interest weight 0.8), both of which are based on interest information for Fran as a user (e.g., from a user profile), and not from membership in a group.

In some implementations in which users can specify that they are dissimilar to other users, propagation of interest and disinterest labels can still occur. However, the interest (or disinterest) can be reversed for labels that are propagated to the user who specifies the dissimilarity. For example, suppose that Dave (e.g., see user node 424) has indicated that he is not at all similar to Fran (e.g., see user node 428). This dissimilarity can be represented in the graph 416 as a dashed arrow 440a, indicating Dave's dissimilarity indication and that interests and disinterests will be reversed during propagation. For example, Fran's interest in dogs and cats can be propagated to Dave as disinterests. At the same time, Fran may have indicated that Dave is a friend, implying similarity in interests and disinterests. As a result, solid arrow 440b indicates that Dave's interests and disinterests will be propagated to Fran as interests and disinterests, and not reversed.

Figure 4D:
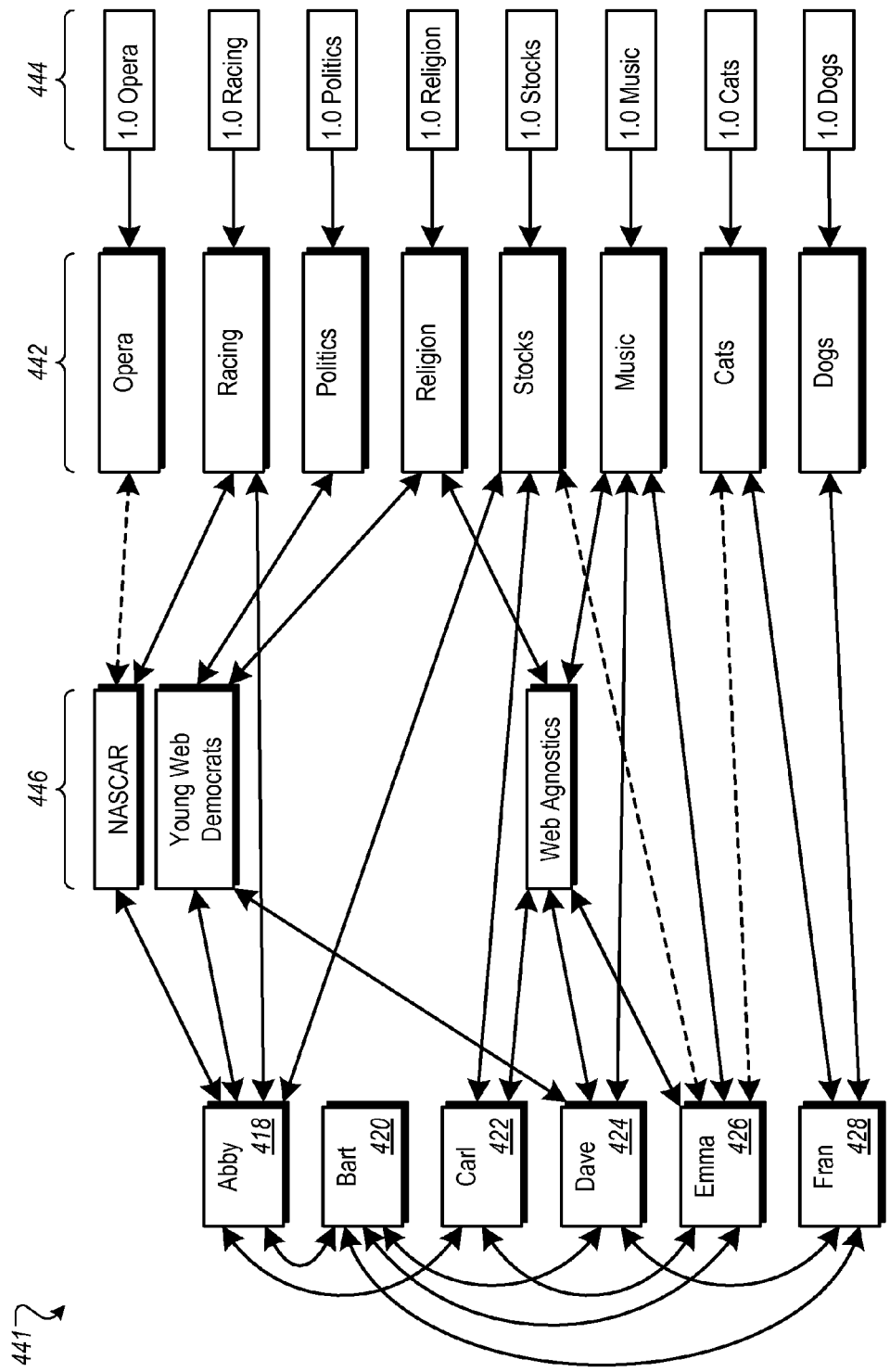

FIG. 4D shows another implementation of a graph data structure 441 for the information illustrated in FIGS. 4A and 4B. Here each user node is associated with a variable label node 442 (e.g., Opera, Racing, Politics, Religion, Stocks, Music, Cats and Dogs). The variable label nodes 442 may include interest and disinterest weights that can be modified based on interest and disinterest weights of neighboring nodes in the graph structure 441. Here, the variable label nodes 442 are also associated with "static" label nodes 444 that specify a single label weight. As shown in FIG. 4D, the user nodes can be associated with more than one variable label node 442.

Additionally illustrated in FIG. 4D are group nodes 446 that are linked by edges to user nodes 418-428 based on user membership in the groups. The group nodes 446 are also linked to label nodes, where, for example, the classifying module 224 links the groups to the label nodes based on textual descriptions of the groups. For example, the Young Web Democrats group node 446 is linked to variable label nodes 442 for Religion and Politics.

Figure 5:
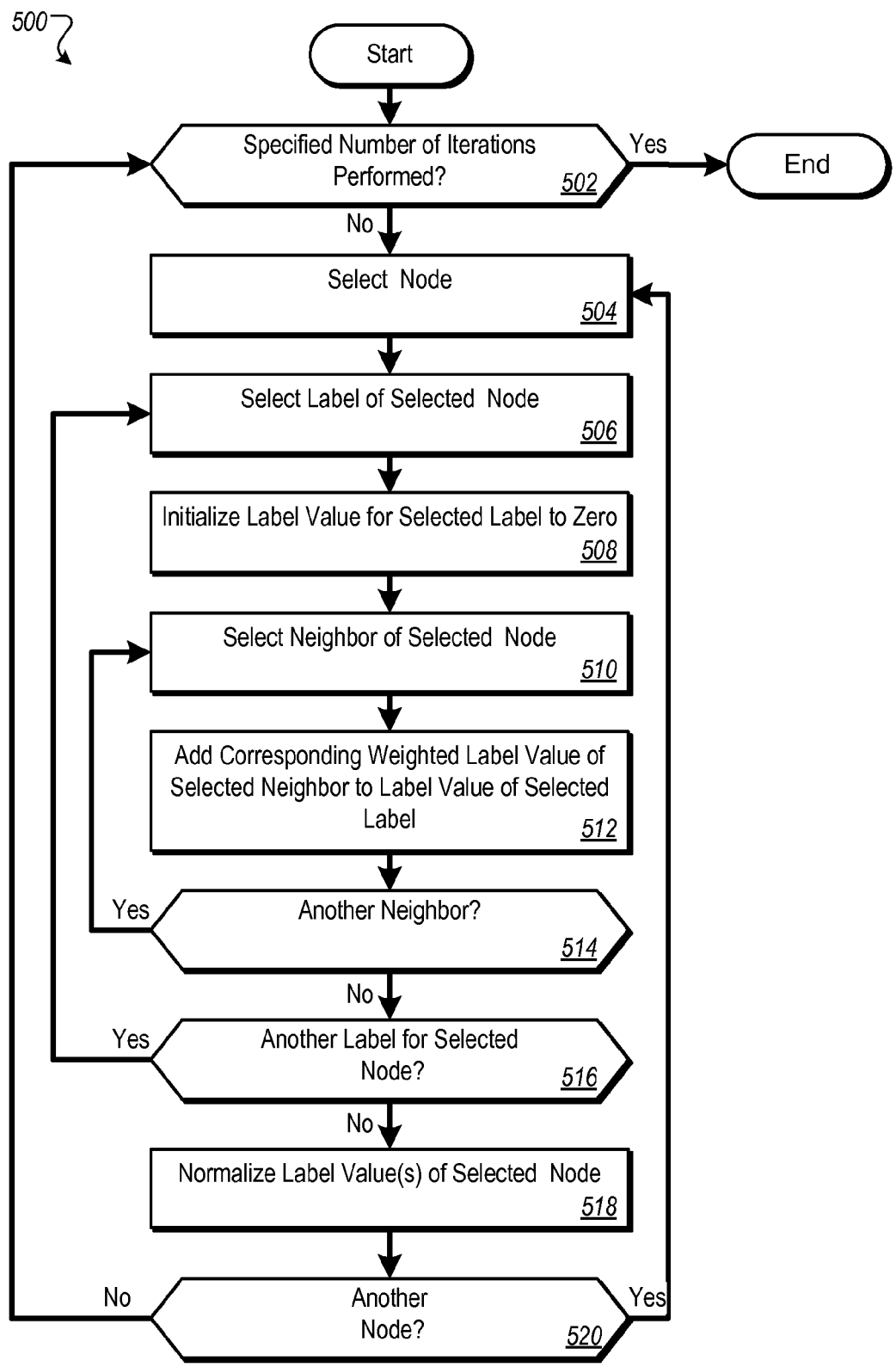
FIG. 5 shows an example method for determining labels based on a neighboring node's labels.

FIG. 5 shows an example method 500 for determining labels based on neighboring nodes' labels. In some implementations, the label generator 204 can perform the method 500 using instructions that are executed by a processor of the server system 104.

The method 500 can be executed using information from the graphs shown in FIGS. 4C and 4D and can be executed for every node in the graphs. The method 500 can start with step 502, which determines if a specified number of iterations have run for a graph. If the number is not complete, then step 504 is performed. In step 504, a node is selected. For example, the label generator 204 can select a node that has label weights that may be modified by the algorithm, such as user nodes, variable label nodes, group nodes, etc.

In step 506, a label is selected from the selected node. For example, the label generator 204 can select the label Stocks if present in the selected node. In step 508, a label weight for the selected label is initialized to zero. For example, the label generator 204 can set the label weight for Stocks to zero.

In step 510, a neighboring node of the selected node can be selected. For example, the selected node may specify that Abby is a friend. The label generator 204 can select a neighboring user node representing Abby.

In step 512, a corresponding weighted label weight of a selected neighbor is added to a label weight of the selected label. For example, if Abby has a label weight for the label Stocks, then the label generator 204 can add this weight to the selected node's label weight for Stocks.

In some implementations, the label weight can also be based on a weight associated with the edge. For example, the edge weight can reflect an explicit association between two nodes. For instance, a first node may specify that the associated user likes a friend Jack (where the weight associated with liking Jack is 0.8), that the user likes friend Jill half as much as Jack, etc. In some implementations, the relative strength of a friendship between two users can be used to generate a numeric connection weight on the edge in a graph that connects the users' corresponding user nodes. In some implementations, the connection weight can be used (e.g., as a multiplier) in determining the extent that a label weight is propagated to a neighboring node. For example, label weights that are propagated between two strong friends can use higher weights than those used for two users having a weaker friendship.

Connection weights, or other weights assigned to edges connecting user nodes, can be based on various factors including, for example, a user's explicit designation of a relative weighting between relationships, two users' mutual explicit designation of affirmation of a relationship, or a measure of degree of relatedness of a node to other nodes in the graph. In the latter example, two nodes that share a significant number of interests (e.g., as indicated by a significant overlap of labels in the two nodes) can have a relatively high connection weight, leading to a potentially greater propagation of labels and weights between the nodes.

In some implementations, the contribution can be weighted based on whether a link to a neighboring node is bidirectional (e.g., the neighboring node also specifies the selected node as a friend).

In step 514, it is determined whether there is another neighbor node to select. For example, the label generator 204 can determine if the selected node is linked by a single edge to any additional neighbors that have not been selected. In another example, a user may specify how many degrees out (e.g., linked by two edges, three edges, etc.) the label generator 204 should search for neighbors. If there is another neighbor that has not been selected, then steps 510 and 512 can be repeated, as indicated by step 514. If there is not another neighbor, then step 516 can be performed.

In step 516, it is determined whether there is another label in the selected node. For example, the selected node can have multiple labels, such as Business, Dogs, and Stocks. If these additional labels have not been selected, then the label generator 204 can select one of the previously unselected labels and repeat steps 506-514. If all the labels in the node have been selected, then the label weights of the selected node can be normalized, as shown in step 518. For example, the label generator 204 can normalize each label weight so that it has a weight between 0 and 1, where the label weight's magnitude is proportional to its contribution relative to all the label weights associated with that node. The normalization can occur for all weights in a group that includes weights for labels associated with interests and weights for labels associated with disinterests.

In step 520, it can be determined whether there are additional nodes in the graph to select. If there are additional nodes, then the method can return to step 504. If all the nodes in the graph have been selected, then the method can return to step 502 to determine whether the specified number of iterations have been performed on the graph. If so, then the method 500 can end.

In certain implementations, the method 500 can include the use of the following pseudo code:

Set t=0
For each node, n, in the graph, G:
    For each label, 1:
        Initialize the label: $n_{l,t}$=0.0;

For t=1..x iterations:
   For each node used to label other nodes, n, in the graph, G:
      For each label, 1:
         Initialize the label amount: $n_{l,t+1}=n_{l,t}$
For each node to be labeled, n, in the graph, G:
   For each label, 1:
      Initialize the label amount: $n_{l,t+1}=0.0$;
For each node, n, in the graph, G:
   For each node, m, that has an edge with weight $w_{mn}$, to n:
      For each label:

$$n_{l,t+1}=n_{l,t+1}+(w_{mn}*n_{l,t})$$

Normalize the weight of the interest labels at each n, so that the sum of the interest labels at each node=1.0. Do the same for the disinterest labels.

In certain implementations, after "x" iterations, the label generator 204 can examine one or more of the nodes of the graph and probabilistically assign a label to each node based on the weights of the labels (e.g., a label with the maximum label weight can be assigned to the node).

In some implementations, the number of the iterations is specified in advance. In some implementations, the algorithm terminates (or can terminate early) when the label weights for the labels at each node reach a steady state (e.g., a state where the difference in the label weight change between iterations is smaller than a specified epsilon).

In another alternative method, label weights for user nodes can be inferred by executing a random walk algorithm on the graphs. More specifically, in some implementations, given a graph, G, the label generator 204 can calculate label weights, or label weights, for every node by starting a random walk from each node. The random walk algorithm can include reversing the direction of each edge in the graph if the edge is directed. If the edge is bi-directional, the edge can be left unchanged.

The label generator 204 can select a node of interest and start a random walk from that node to linked nodes. At each node where there are multiple-out nodes (e.g., nodes with links to multiple other nodes), the label generator 204 can randomly select an edge to follow. If the edges are weighted, the label generator 204 can select an edge based on the edge's weight (e.g., the greatest weighted edge can be selected first).

If during the random walk, a node is selected that is a labeling node (e.g., used as a label for other nodes), the classification for this walk is the label associated with the labeling node. The label generator 204 can maintain a tally of the labels associated with each classification.

If during the random walk, a node is selected that is not a labeling node, then the label generator 204 selects the next random path, or edge, to follow.

The label generator 204 can repeat the random walk multiple times (e.g., 1000 s to 100,000 s of times) for each node of interest. After completion, the label generator 204 can derive the label weights based on the tally of labels. This process can be repeated for each node of interest.

FIGS. 6A-6E show different states of an example graph 600 representing users in a social network, where an algorithm is used to propagate label weights throughout nodes in the graph. In some implementations, the algorithm may include some or all of the steps of the method 500, the above pseudo code, or the described random walk algorithm. For simplicity, the graph 600 includes nodes representing only six users in the social network. However, other entities may be represented in the graph 600 as well, such as hundreds or thousands of other users, groups of users, labels, etc.

In some implementations, the algorithm can be run for a user-specified number of iterations. During each iteration, an initial value is created for each label weight of each node, and added to that initial value is a value corresponding to a label weight of each of the neighboring nodes having the same label. However, in the example illustrated collectively by FIGS. 6A-6E, only one iteration of propagation is used.

In some implementations, each node in the graph 600 can be connected to less than all of the other user nodes with which a user has a relationship. For example, connections can be limited to a user's closest friends, e.g., the ones that the user has designated as closest friends and/or closest friends automatically determined based on interactions between the user in the social network (e.g., postings, tagging of photos, emails, etc.).

Figure 6A:
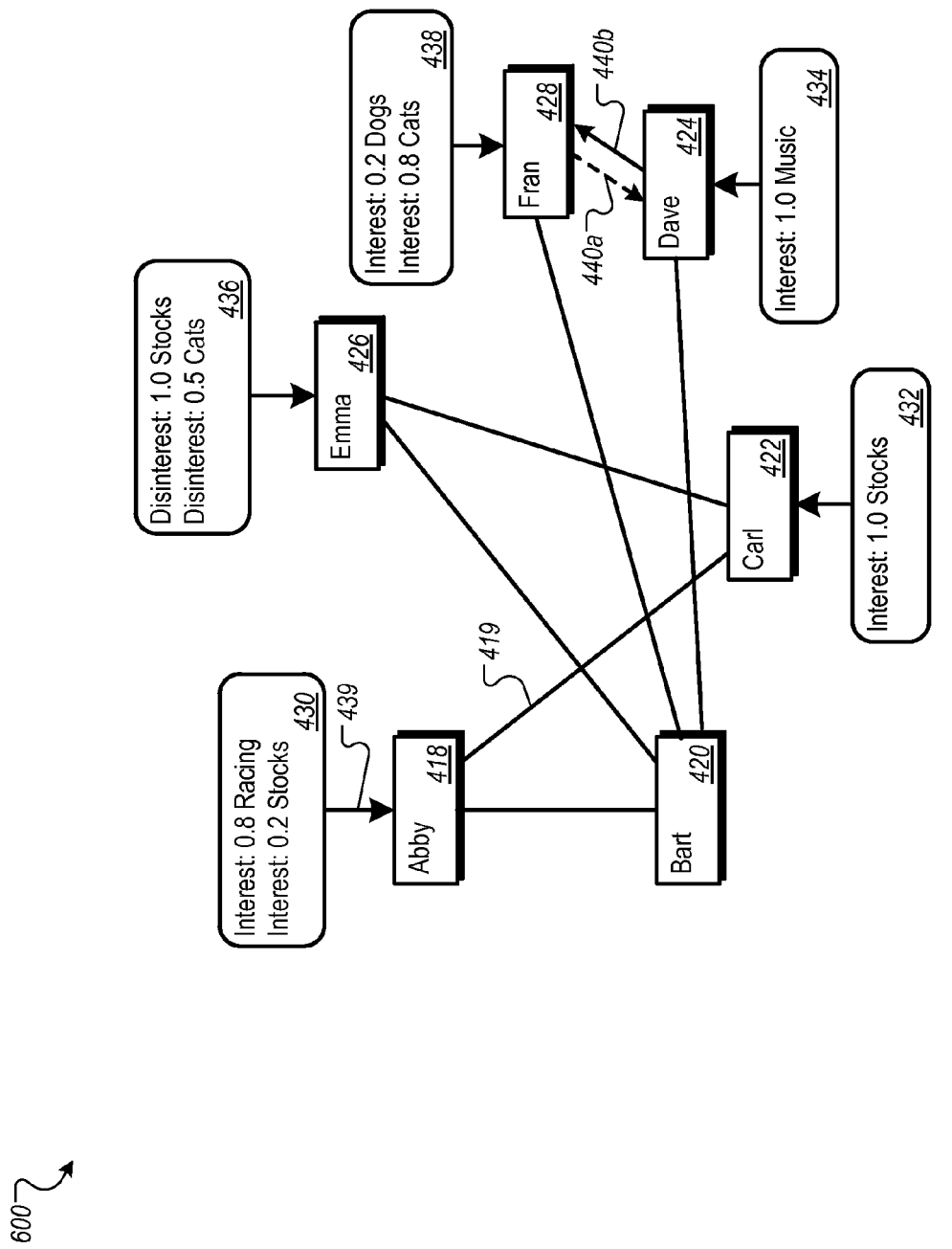
FIGS. 6A-6E show example graphs of users in a social network, where an algorithm is used to determine label weights for the users.

As shown in FIG. 6A, the graph 600 includes six user nodes 418-428, each of which represents a user within a social network system. The labels for each user appear in the corresponding label nodes 430-438. Each of the label nodes associates a user node with labels having weights that reflect a probable interest or disinterest of the user, e.g., an interest in content associated with that label. The labels for the graph 600 include Opera, Racing, Politics, Religion, Stocks, Music, Cats and Dogs. In some implementations, the labels associated with each user node can be determined by the classifying module 224, e.g., determined from user profiles, from posts made by the users, from text describing groups to which the users belongs, etc.

FIG. 6A shows an example state of the graph 600 before propagation. In this state, each of the label nodes 430-438 shows the respective user's interests and disinterests, but no normalization is shown. For example, the label node 436 for Emma indicates a disinterest weight 1.0 for Stocks and a disinterest weight 0.5 for Cats. In some implementations, a user's interests can be normalized before each propagation. Normalization can also occur separately for the user's disinterests. In some implementations, the normalized weights can each be in the range of 0.0 to 1.0, and they can total to 1.0. The graph 600 does not reflect user interests represented by interest weights associated with the group nodes 446 shown in FIG. 4D.

Figure 6B:
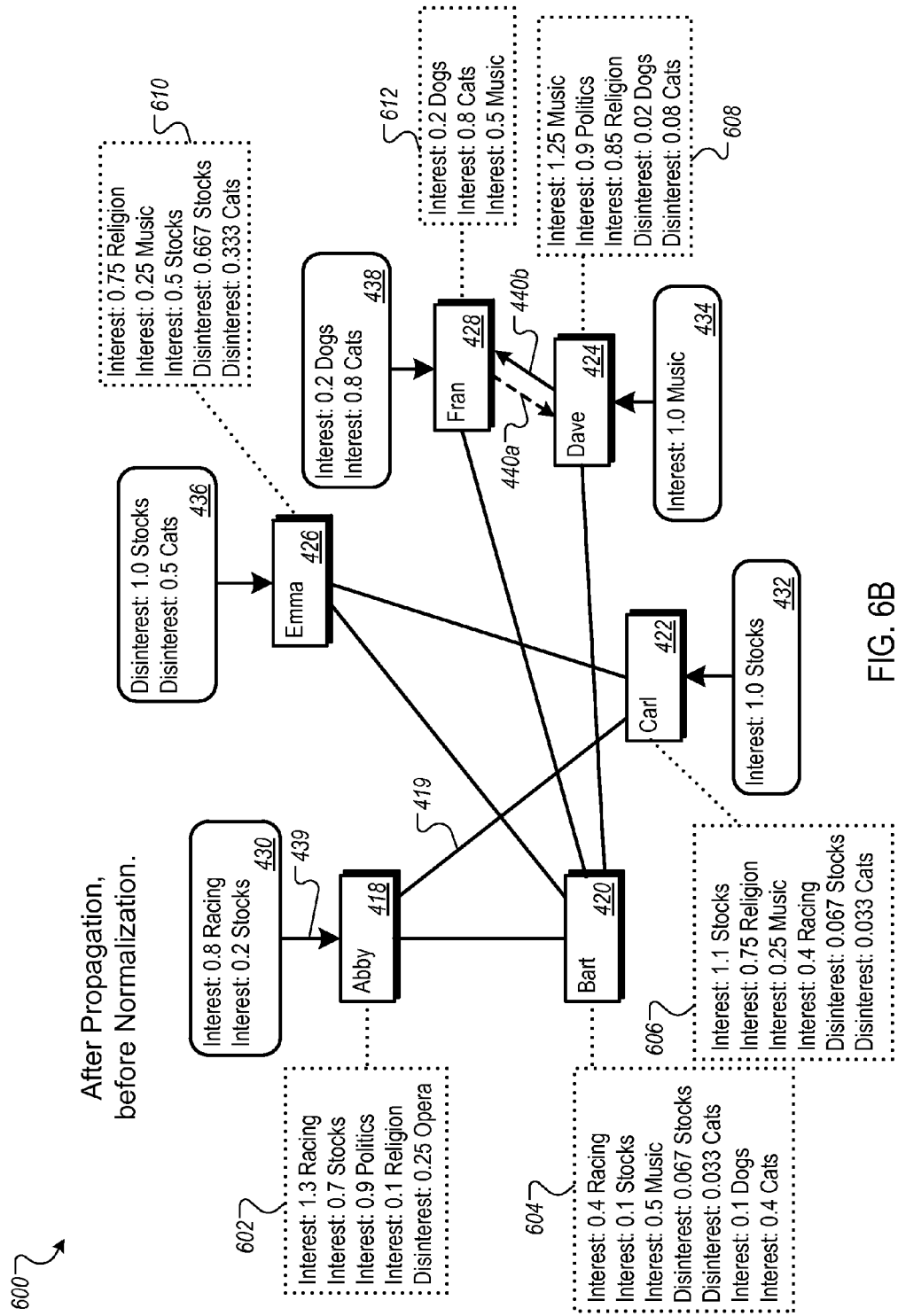

FIG. 6B shows an example subsequent state of the graph 600 after propagation in which the graph 600 includes weight nodes 602-612 that are associated with user nodes 418-428, respectively. Each of the weight nodes 602-612 includes interest and/or disinterest weights based on propagation from the user's explicit interests/disinterests, the groups to which the user belongs, and interests/disinterests of other users. For example, because Emma belongs to the Web Agnostics group which includes associated interests in religion and music, the weight node 610 for Emma includes interest weights for religion and music. Further, the weight node 610 for Emma includes an interest weight for Stocks that is propagated from Carl. In some implementations, different percentages (or propagation weights) can be used for propagation. For example, a user's own interests and disinterests can be propagated back to the user using a propagation weight of 100% (e.g., Fran's interest weights of 0.2 and 0.8 for Dogs and Cats). Similarly, the interests/disinterests associated with the group(s) to which the user belongs can be propagated at 100% (e.g., 0.75 and 0.25 interest weights in Religion and Music, respectively). Other propagation weights can be used for a user's associated groups. In some implementations, smaller propagation weights can be used to propagate interests and disinterests between users, e.g., using a 50% propagation weight for interests and a 10% propagation weight for disinterests. In this way, the interests of a user's friends (and to a greater extent the disinterests of a user's friends) can be prevented from over-powering the interests of the user.

For example, the weight node 610 associated with the user Emma can include Emma's normalized disinterests in Stocks and Cats, resulting in propagated disinterest weights of 0.667 and 0.333 for Stocks and Cats respectively. The interest weights of 0.75 for Religion and 0.25 for Music can result from Emma's association with the Agnostic group, and the 0.5 interest weight can result from 50% of Carl's 1.0 interest weight in Stocks. In some implementations, a user's group-based interests can be propagated to other users; however this feature is not used in the current example.

As described above for some implementations in which users can specify that they are dissimilar to other users, propagation of interest and disinterest labels can be adjusted accordingly. In some implementations, the interest (or disinterest) can be reversed for labels that are propagated to the user who specifies the dissimilarity. For example, as described above, dashed arrow 440a can indicate that Dave is not at all similar to Fran, and the dissimilarity indication can cause interests and disinterests to be reversed during propagation from Fran to Dave. For example, Fran's 0.2 interest weight in Dogs and 0.8 interest weight in Cats can be propagated to Dave as disinterests (though scaled using propagation weights of 10%). At the same time, Fran may have indicated that Dave is a friend, implying similarity in interests and disinterests. As a result, solid arrow 440b indicates that Dave's interests and disinterests will be propagated to Fran as interests and disinterests, and not reversed.

Figure 6C:
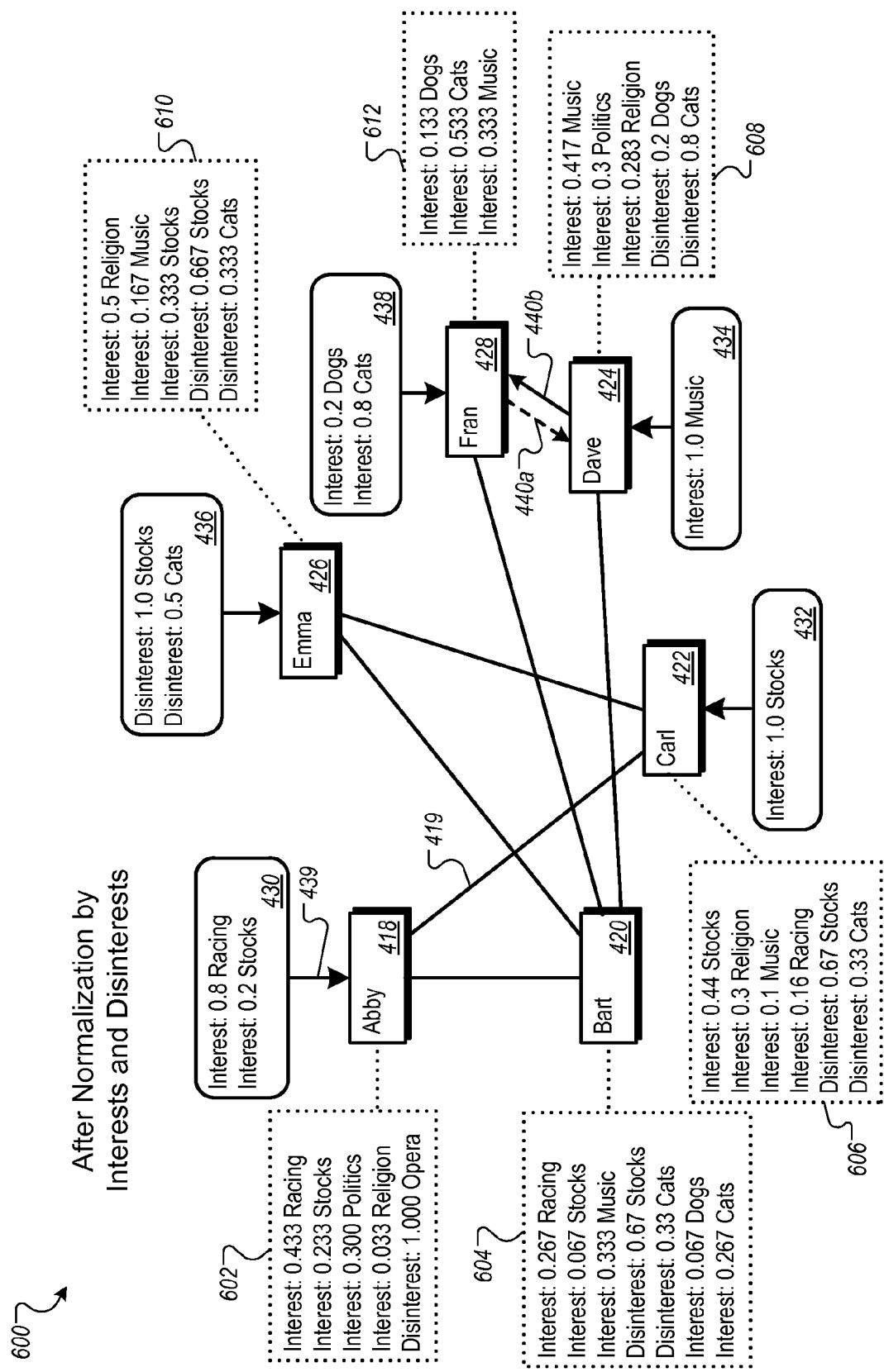

FIG. 6C shows an example new state of the graph 600 of FIG. 6B after interests and disinterests are normalized independently. For example, the sum of Abby's interest weights of 1.3, 0.7, 0.9 and 0.1 for Racing, Stocks, Politics and Religion, respectively, is 3.0. In some implementations, the sum can be used as a divisor to compute normalized interest weights. For example, using the divisor 3.0, normalized interest weights of 0.433, 0.233, 0.300 and 0.033 can be computed for Racing, Stocks, Politics and Religion, respectively. The Opera disinterest weight, being the only disinterest weight, can itself be used as a divisor, resulting in a normalized disinterest weight of 1.0 for Opera.

Figure 6D:
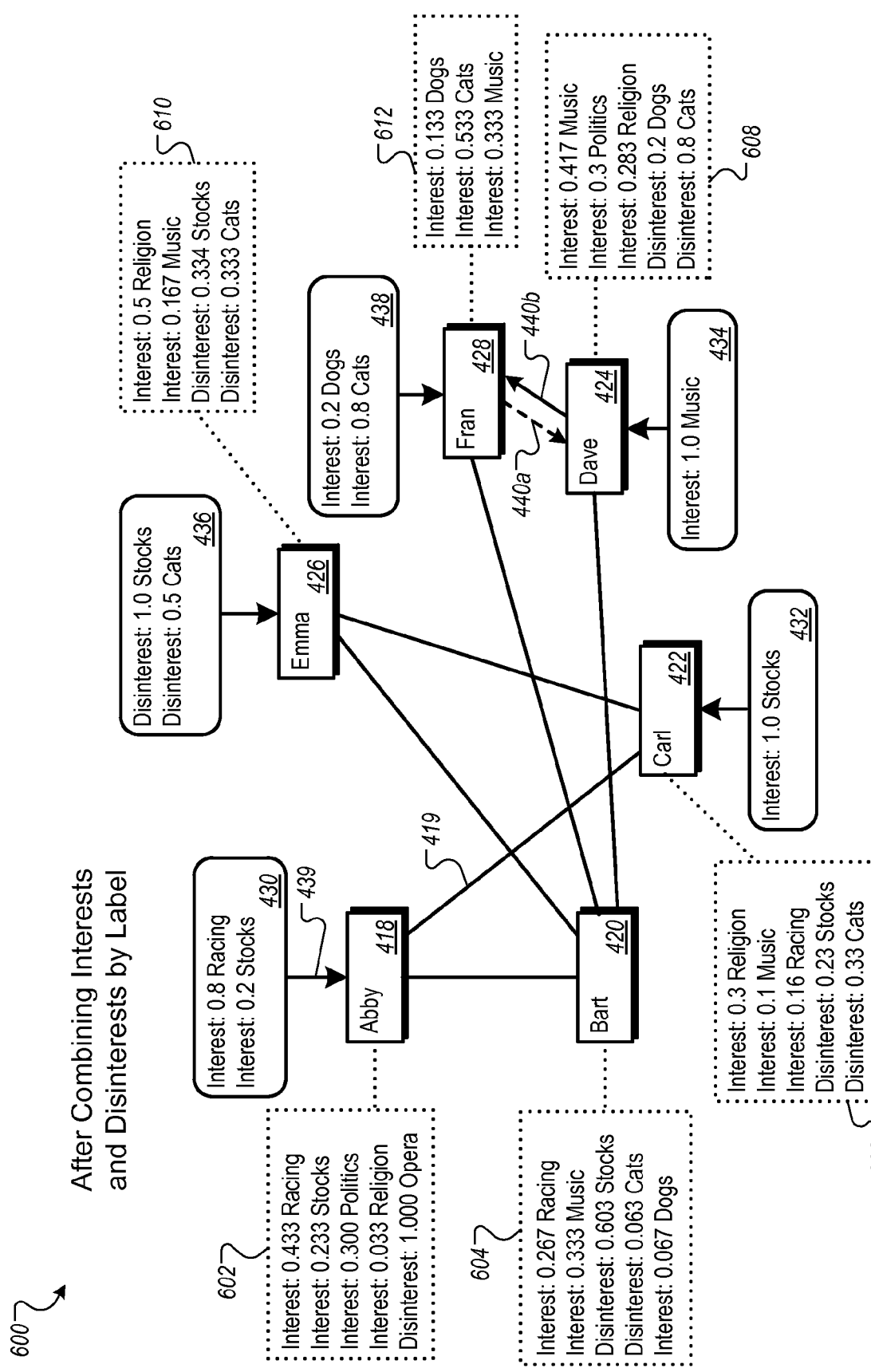

FIG. 6D shows an example new state of the graph 600 of FIG. 6C after interests and disinterests are summed or combined. For example, a sum can be determined from Bart's propagated (then normalized) interest in Stocks from Abby and the propagated (then normalized) disinterest from Emma, resulting in a total reflecting an effective disinterest in Stocks.

Figure 6E:
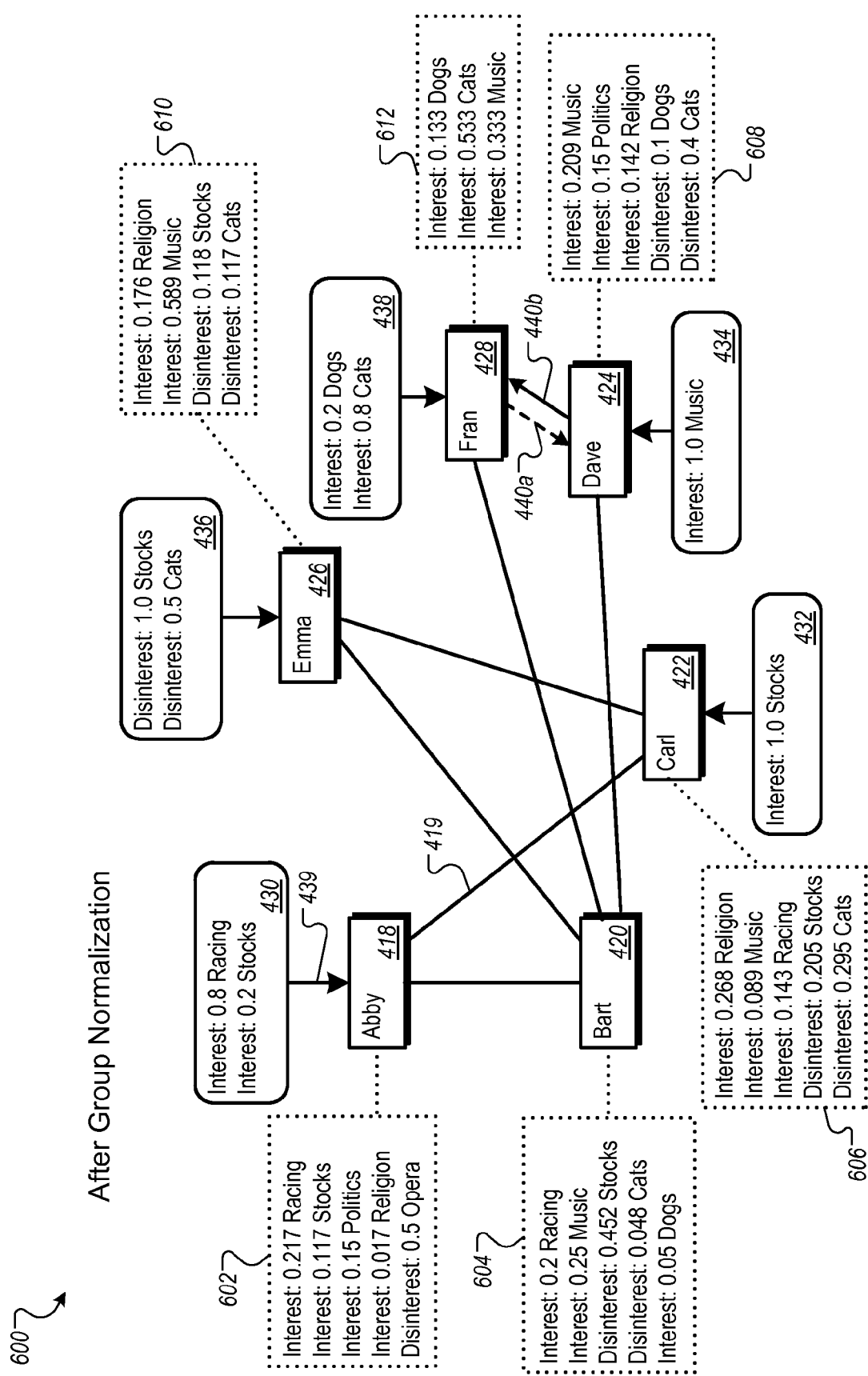

FIG. 6E shows an example new state of the graph 600 of 6D after group normalization. For example, the interests and disinterests can be normalized as a group by summing the values, including interests and disinterests, and dividing each interest and disinterest by the sum.

In some implementations, label weights in the label nodes, such as 430-438, are not modified. Instead, for every iteration, the label nodes can provide one or more static label weights that are used to modify the label weights of user nodes to which they are linked. In some implementations, the static label weights can be normalized.

In some implementations, weights for interest-related labels propagated from one node to another can be reduced using a percentage factor (e.g., 50%) so that a user's interest can have a significantly higher weight than a friend's interest that is propagated. For example, Fran's interest in Dogs (0.2) and Cats (0.8), when propagated to Bart, can be propagated at one-tenth their weight, e.g., at Dogs (0.1) and Cats (0.4), so as not to overpower Bart own interests and disinterests.

In some implementations, weights for disinterest-related labels propagated from one node to another can be reduced using an even smaller factor (e.g., 10%). For example, Abby's disinterest in Opera (0.25), when propagated to Carl, can be propagated at one-tenth the weight (e.g., at 0.025).

Figure 7:
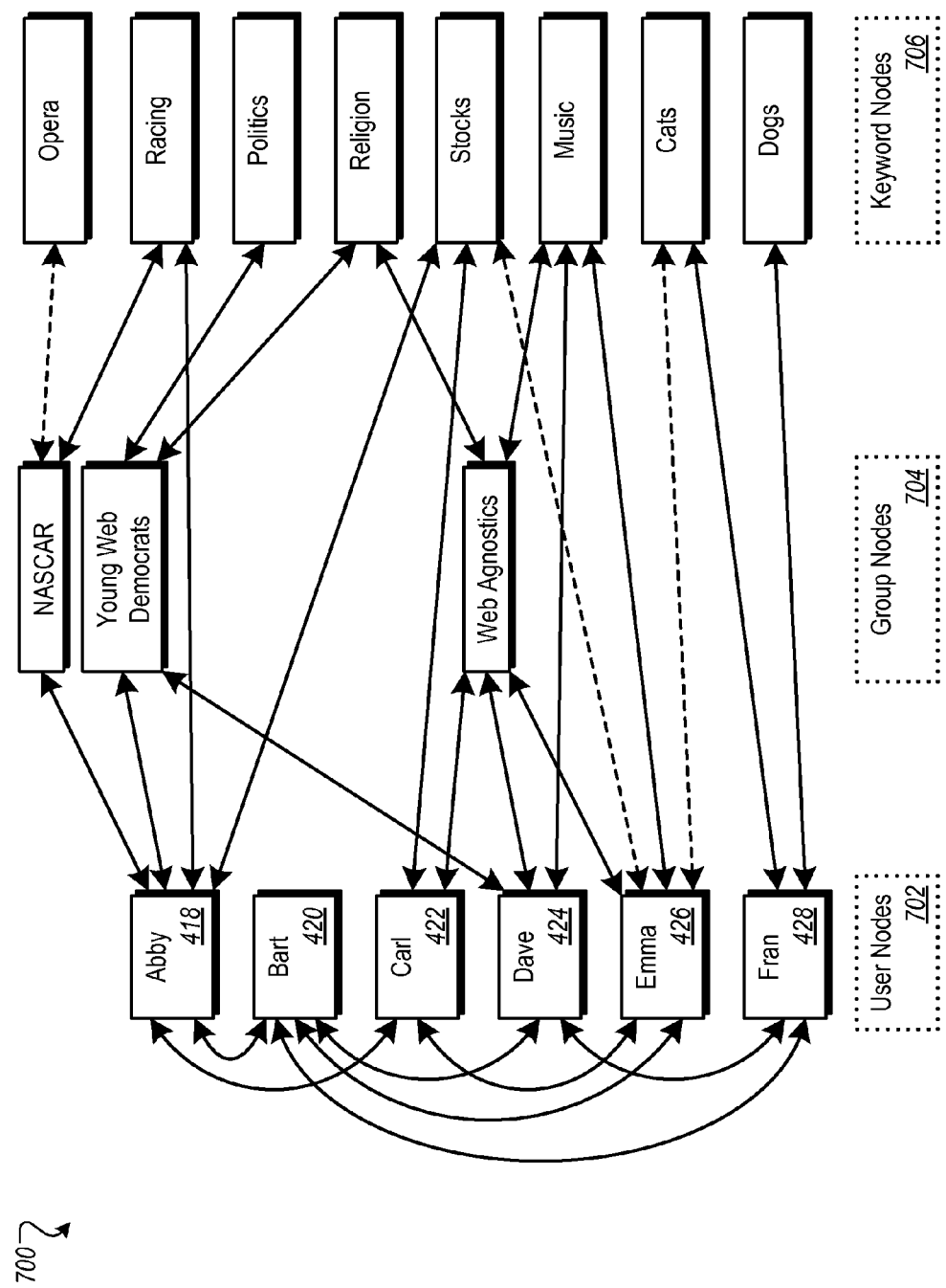
FIG. 7 is an alternative graph for use in inferring user interests.

FIG. 7 is an alternative graph 700 for use in inferring user interests. In some implementations, the graph 700 is substantially similar to the graph described in association with FIG. 4D; however, the label nodes that inject static label weights are excluded for clarity. The graph 700 includes user nodes 702, group nodes 704, and keyword nodes 706. Here, for the purpose of this example, the labels are keywords. The user nodes 702 can be linked to the group nodes 704 based on membership relationships as discussed previously, and the user and group nodes 702, 704 can be linked to the keyword nodes 706 in a substantially similar way as these nodes 702, 704 are linked to other label nodes.

As discussed previously, the label generator 204 can use multiple graphs to determine the label weights and compare the output of processed graphs to determine final label weights based on an expected a priori distribution.

In some implementations, a graph can include one or more uncharacterized label nodes that are used to reduce the effect by distant nodes on a respective node. When the label of a node is determined based on, for example, the label with the greatest label weight, the weight assigned to the uncharacterized label can be ignored and the remaining weights used in the determination. For example, the uncharacterized label nodes' contribution can be removed from the calculation of the label weights at the end of the algorithm (e.g., after the label weights have reached a steady state or a specified number of iterations have occurred).

In some implementations, uncharacterized label nodes can be used in any or all of the graphs generated by the label generator 204. In some implementations, a user may specify for which graph(s) the uncharacterized label nodes are to be used.

In some implementations, uncharacterized label nodes are associated with all nodes in the graph. In some implementations, uncharacterized label nodes are assigned to a small number of nodes, such as nodes that are not associated with initial labels (e.g., based on a lack on label-derivable information in the content of user profiles, etc.).

Figure 8:
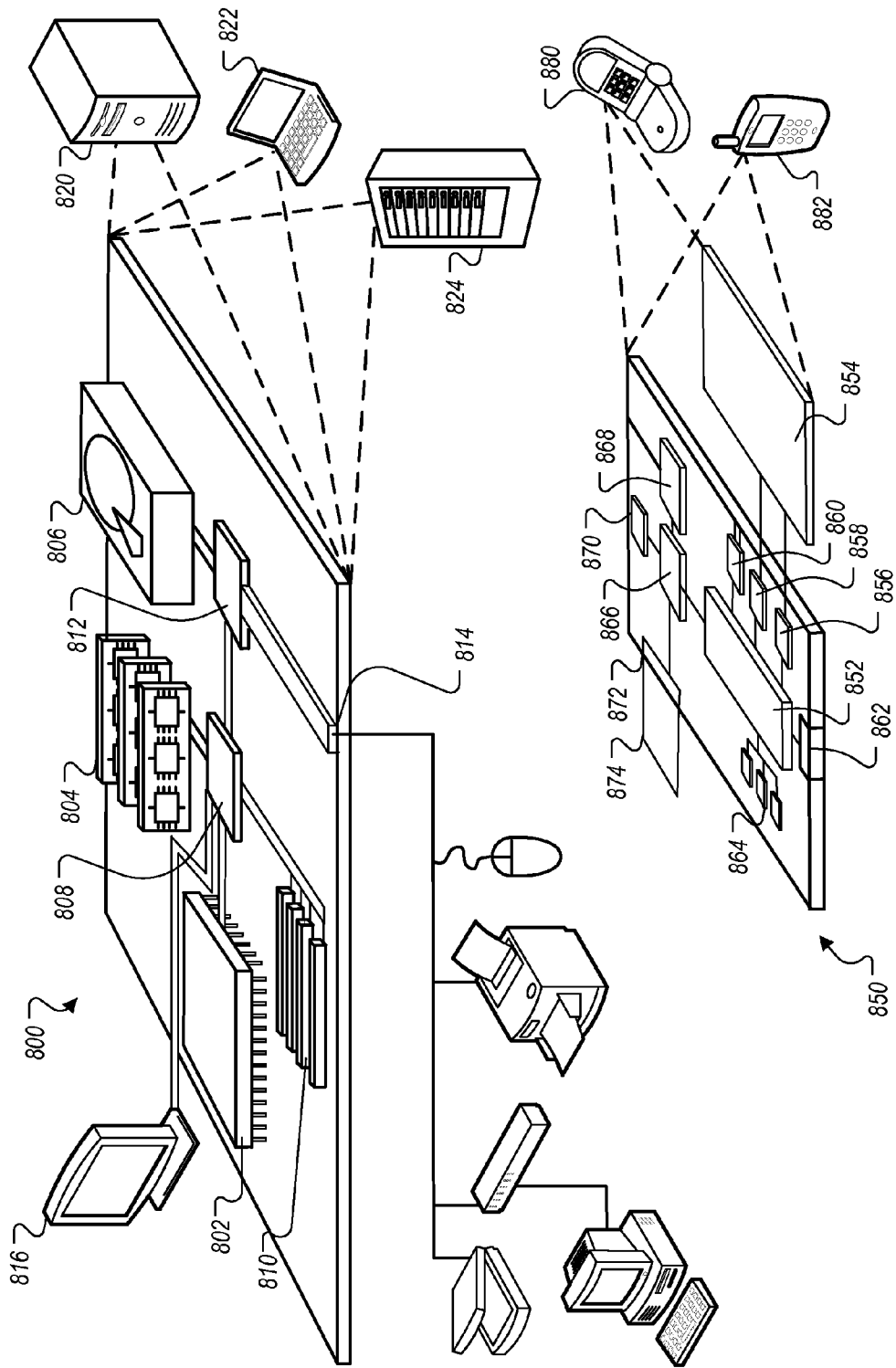
FIG. 8 is a block diagram of example computing devices that may be used to implement the systems and methods described in this document.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In some implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In some implementations, the memory 804 is a computer-readable medium. In some implementations, the memory 804 is a volatile memory unit or units. In other implementations, the memory 804 is a non-volatile memory unit or units.

The storage device 806 is capable of providing mass storage for the computing device 800. In some implementations, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In some implementations, a computer program product is tangibly embodied in an information carrier. The computer program product contains instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of duties is exemplary only. In some implementations, the high-speed controller 808 is coupled to memory 804, display 816 (e.g., through a graphics processor or accelerator), and to high-speed expansion ports 810, which may accept various expansion cards (not shown). In some implementations, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, and an input/output device such as a display 854, a communication interface 866, and a transceiver 868, among other components. The device 850 may also be provided with a storage device, such as a Microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In some implementations, the memory 864 is a computer-readable medium. In some implementations, the memory 864 is a volatile memory unit or units. In some implementations, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hack able manner.

The memory may include for example, flash memory and/or MRAM memory, as discussed below. In some implementations, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS receiver module 870 may provide additional wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In certain implementations, the label nodes do not have to be high-level semantic nodes. Instead, they may be individual keywords. For example, they may be the union of the set of keywords that occur on every user's page/description of themselves and every group's description, etc.

In some implementations, there may be keywords that are uncommon. For example, the common word "the" may not provide much information, but the relatively uncommon keyword "basketball" may. These types of words can be used by classifying module 224 when implementing, for example, the common TF-IDF (term frequency-inverse document frequency) measure. Additionally, the keywords can be selected from terms that advertisers often use to target online ads, or keywords including hand-selected terms that are of interest.

In certain implementations, the graph or graphs that are created do not have to have an edge between all the friends that a user specifies. If the friends are ranked or weighted, only the top N friends may be chosen (e.g., a user's best friends). In other implementations, the label generator 204 may only select the links for which each user specifies each other as a friend.

In some implementations, a graph may have weighted edges. In some implementations, each connection can be weighted the same. In some implementations, edges can be weighted differently based on a number of factors. For example, if user-A specifies that he likes user-B more than user-C, then the connection from A to B may be stronger than from A to C. In another example, if user-A and user-B both specify that they like each other, the strength of the connection may be stronger (for example, the connection may be twice as strong). In yet another example, the label generator 204 can weight the edges in proportion to the out-degree of a node.

Other weighting factors can be based on whether a user identifies with one group more than another group. In this case, the weights on the edges may be greater for preferred groups, such as groups that include frequent content postings from the user. Also, a user may have a stronger affinity for some keywords rather than for other keywords (e.g., a user may use the word "venture" much more than the word "sports"). Weights between users also can be based on a frequency of interaction, such as messages between the users, visits to each other's home pages or profiles, etc.

In other implementations, edges can be weighted based on when a 'friend' was added. For example, a link to a recently added friend can be weighted greater than previously added friends because the recently added friend may indicate a current interest. In another implementation, an edge linking an "older" friend can be weighted more heavily. For example, if the friend has been a friend for a while, and it is known that the user takes off friends periodically, then a friend who has lasted on the friend list can be weighted higher. Additionally, similarity metrics between users (e.g., a percent of overlap in the words that they use) can be used to weight the connections. For example, users that have a heavy overlap in term usage can have links that are weighted more heavily than users who do not have a significant overlap. In some implementations, the described algorithm and methods do not have to run until convergence. They can be stopped earlier, and the label generator 204 can read the magnitudes of the label weights at the nodes.

In some implementations, the combination-weights that are used to combine the end results may be set to (0,1) or (1,0), which selects only one of the graphs and not the other. Additionally, the combination function may not be linear or continuous. For example, the label generator 204 may specify that if the labels produced from Graph-A are too uniform then only labels generated from Graph-B are selected for use, for example, in targeting online ads.

Additionally, the term 'user,' as specified, for example, in the described pseudo code and method 500, may actually be a group in the social network system. Additionally, the term "user" can be substituted for other entities described in the graphs, such as keywords, advertisers, ad groups, etc.

In certain implementations, the set of labels used can include advertisements. For example, the labels propagated through the graph can include advertisements on which one or more users have clicked. In this implementation, after advertisement labels are inferred throughout a graph, for each user, the label generator 204 can output a set of advertisements on which each user may be likely to click.

In another implementation, the label generator 204 can select labels for users to target ads, etc., where the labels are derived based on an initial machine-learning classification, or the label generator 204 can use the inferred labels generated by executing the above algorithms and methods on the graph to infer labels for each user.

In certain implementations, we can apply the same algorithms and methods based on a directed graph between users (e.g., if user A says that user B is a friend, this is a directed edge instead of an undirected one, which implies that user B specifies that user A is also a friend).

Additionally, in a data structure, such as the graph 441 of FIG. 4D, the links between users may be optional if there are enough common groups/keywords. For example, there may be "enough" common groups/keywords if a defined threshold of the graph connectivity is met (e.g., if the average user node is connected by two edges to at least two other users, etc.)

In certain implementations, if there are more labeling nodes having label-A than having label-B, the label generator 204 can normalize each label weight so that the sum of the label weights for each type is the same for each label (e.g., across all labeling nodes, the sum of label-A=1.0 and across all labeling nodes, the sum of label-B=1.0).

In other implementations, the normalization step as described in the algorithms and methods linearly weights the magnitudes of the label weights and scales them to 1.0; however, the label generator 204 can use various normalization or non-linear function for normalization.

In some implementations, the label generator 204 can modify a graph's structure (e.g., remove a percentage of the connections, such as the connections that fall within the lowest one percent of weighted connections). This may approximate the random walk discussed previously. Additionally, instead of maintaining all labels at every node, the label generator 204 may only maintain subset of the labels.

In parallel implementations, highly connected nodes may be processed using the same processor, which may reduce message passing. Additionally, the approximation can be computed in a layer-wise manner, where each layer includes, for example, a certain type of node. For example, one layer may include user nodes, another layer group nodes, and another layer keyword nodes, as shown in FIG. 9A. In some implementations, the algorithms and methods discussed above can be computed for pairs of layers instead of all the layers at once. For example, some number of iterations of the method are computed between a first and second layer, some between the second and third layer, and some between the third and fourth layer) and then the method can be repeated, etc.

In addition, the logic flows depicted in the figures do not require the particular order shown, or sequential order, to achieve desirable results. In addition, other steps may be provided, or steps may be eliminated, from the described flows, and other components may be added to, or removed from, the described systems. For example, the first and second data stores 206, 208 can reside in a single storage device, such as a hard drive.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by a computer system, the method comprising:
  determining, by the computer system, a set of labels to be associated with users of a social network, the labels including one or more designators for specifying areas of interest and areas of disinterest for a user;
  associating, by the computer system, one or more of the set of labels to nodes in a graph that represent the social network, wherein the users are represented by user nodes in the graph;
  determining that a user is similar or dissimilar to another user in the social network, including determining a measure of similarity between the user and the other user, wherein the measure of similarity includes a similarity score determined from user interests and disinterests associated with a respective user, wherein the similarity score is based at least in part on similarity or dissimilarity of the user and the other user;
  determining, by the computer system for each respective node, weights for the labels, each weight reflecting a magnitude of a contribution of an associated label to a characterization of the respective node; and propagating labels for a respective node to other nodes that are related to the respective node by a relationship including propagating labels in accordance with the determined measure of similarity including, when propagating labels between two nodes that have been determined to be dissimilar based on the determined similarity score, propagating areas of interest of one node of the two nodes as being of disinterest to another node of the two nodes and areas of disinterest as being of interest to the another node.

2. The method of claim 1 further comprising receiving an indication of the similarity or dissimilarity, the indication received from one or more of user input or as a result of an inference that is automatically determined, wherein the indication is used in determining the measure of similarity.

3. The method of claim 2 wherein the indication is determined automatically based on an overlap of interest or disinterest information between the user and another user.

4. The method of claim 3 wherein the interest and disinterest information includes one or more of user-stated preferences or words in user profiles.

5. The method of claim 4 further comprising using the overlap of interest or disinterest information to determine a connection weight between nodes, in the graph, representing the user and another user.

6. The method of claim 2 wherein the indication is a similar indication and wherein propagating labels includes propagating areas of interest as being of interest to the user and areas of disinterest as being of disinterest to the user.

7. The method of claim 2 wherein the indication is a dissimilar indication and wherein propagating labels includes propagating areas of interest as being of disinterest to the user and areas of disinterest as being of interest to the user.

8. The method of claim 1 wherein propagating labels further comprises normalizing the labels for one or both the areas of interest and the areas of dis-interest as a group.

9. The method of claim 1 wherein identifying the set of labels further comprises retrieving the labels from a profile associated with a user associated with a respective node.

10. The method of claim 1 further comprising implicitly assigning labels to users based on historical activities of the user.

11. The method of claim 1 further comprising assigning labels to users based on receipt of explicit designations of interest or dis-interest.

12. The method of claim 11 wherein each designation of interest is associated with a like action or the designation of disinterest is associated with a dis-like action.

13. The method of claim 11 wherein each designation of interest is associated with an affirmation action or the designation of disinterest is associated with a disaffirmation action.

14. The method of claim 1 wherein labeling includes assigning labels based on an evaluation of content associated with a user.

15. The method of claim 1 wherein labeling includes assigning labels based on a combination of explicit designations and implicit determinations.

16. The method of claim 15 wherein implicit determinations are made based on user interaction with content.

17. The method of claim 16 wherein the user interactions are click-throughs.

18. The method of claim 1 further comprising determining a relative level of interest or disinterest that is associated with each label for a given user.

19. The method of claim 18 wherein the relative level of interest is expressed in terms of a percentage.

20. The method of claim 18 wherein the relative level of interest is normalized.

21. The method of claim 1 wherein propagating the labels includes propagating the labels to a neighbor node based at least in part on the assigned weights and types of connections between respective nodes.

22. The method of claim 21 wherein the type of relationship is selected as being one of similar or dissimilar.

23. The method of claim 22 wherein the measure of similarity includes a degree of similarity between a user and a connected other user represented by an adjoining node.

24. The method of claim 21 wherein propagating the labels includes determining a label weight to propagate for each label to an adjoining node based at least in part on an assigned weight of a respective label and a weight associated with a connection to the adjoining node.

25. The method of claim 1 wherein identifying a set of labels includes identifying one or more groups that a user is included in and wherein identifying includes identifying one or more labels associated with a respective group and assigning the one or more labels to each member of the respective group.

26. The method of claim 1 wherein assigning weights further comprises determining a predicted distribution of magnitudes of weights assigned across a group of users and adjusting magnitudes for labels of one or more users nodes based at least in part on a comparison to the predicted distribution.

27. The method of claim 1 wherein assigning weights further comprises determining a confidence factor for each weight and propagating includes adjusting weights propagated for a label based at least in part on the confidence factor.

28. The method of claim 1 further comprising targeting content to respective users based at least in part on the assigned labels and weights.

29. The method of claim 1 wherein the labels are keywords.

30. The method of claim 1 wherein the labels are uncommon keywords associated with a user.

31. The method of claim 1 wherein each node is connected to less than all of the other user nodes that a user has a relationship with.

32. The method of claim 1 wherein the edges that connect the user nodes are weighted based on one or more of a user's explicit designation of a relative weighting between relationships, two user's mutual explicit designation of affirmation of a relationship; or a measure of degree of relatedness of a node to other nodes in the graph.

33. The method of claim 1 wherein the user represents a group of users.

34. The method of claim 1 wherein the labels are advertisements.

35. The method of claim 34 wherein a respective user has indicated either an interest or dis-interest in content associated with a respective advertisement.

36. The method of claim 1 wherein the graph includes one or more uncharacterized label nodes that are used to reduce an effect of faraway nodes on a respective node.

37. The method of claim 2 wherein normalizing includes linearly weighting magnitudes of labels for a user node and scaling them to a scale of 1.0.

38. The method of claim 1 wherein the relationship is a social relationship.

39. The method of claim 1 wherein the relationship is a friendship specified by a user represented by a respective node.

40. The method of claim 1 wherein the relationship is selected from a group consisting of a relationship based on group membership specified by a user represented by a respective node, a relationship based on similarity between content generated by the users represented by the respective node and the neighboring nodes, and a relationship based on similarity of a web-site visiting pattern.

41. The method of claim 1 wherein the user nodes representing the users of the social network comprise group nodes representing groups of users and individual user nodes representing individual users.

42. The method of claim 1 further comprising generating the graph that includes the nodes and expresses relationships between the nodes as edges connecting the nodes.

43. The method of claim 42 wherein the edges are weighted based on factors selected from a group consisting of whether the relationships are bi-directional, a number of links between the nodes, a frequency that a user visits another user's profile, and payment terms specified by advertisers.

44. The method of claim 1 further comprising outputting, for each respective node, weights for the user labels based on weights of user labels associated with neighboring nodes, which are related to the respective node by a relationship.

45. The method of claim 1 further comprising determining a node's weight for a label by selecting each neighboring node and adding the weights of the neighboring nodes' labels to the node's weight for the label.

46. The method of claim 45 wherein the label weight of the neighboring node's label is at least partially based on a relationship relating a node to the node's neighbors.

47. A method implemented by a computer system, the method comprising:
  identifying one or more labels of interest to be associated with users of a user group;
  classifying each user including determining an association between the one or more labels and each respective user wherein the labels include areas of interest and areas of dis-interest as either explicitly or implicitly determined for a given user;
  providing a first graph of the user group that includes a plurality of nodes, one node for each user and one or more label nodes that inject weights for the labels into each respective user node, including providing edges between user nodes that represent relationships between the users and assigning labels to each user based on the classifying;
  determining weights for each label for each user node in the first graph;
  determining that a user is similar or dissimilar to another user in the social network, including determining a measure of similarity between the user and the other user, wherein the measure of similarity includes a similarity score determined from user interests and disinterests associated with a respective user, wherein the similarity score is based at least in part on similarity or dissimilarity of the user and the other user; and
  propagating the weights to one or more neighbor nodes connected to a respective user node based at least in part on the determined measure of similarity including, when propagating weights between two nodes that have been determined to be dissimilar based on the determined similarity score, propagating areas of interest of one node of the two nodes as being of disinterest to another node of the two nodes and areas of disinterest as being of interest to the another node.

48. The method of claim 47 further comprising receiving an indication from the user of the similarity or dissimilarity.

49. The method of claim 48 wherein the indication is determined automatically based on an overlap of interest or disinterest information between the user and another user.

50. The method of claim 48 wherein the interest and disinterest information includes one or more of user-stated preferences or words in user profiles.

51. The method of claim 50 further comprising using the overlap of interest or disinterest information to determine a connection weight between nodes, in the graph, representing the user and another user.

52. The method of claim 48 wherein the indication is a similar indication and wherein propagating labels includes propagating areas of interest as being of interest to the user and areas of disinterest as being of disinterest to the user.

53. The method of claim 48 wherein the indication is a dissimilar indication and wherein propagating labels includes propagating areas of interest as being of disinterest to the user and areas of disinterest as being of interest to the user.

54. The method of claim 47 further comprising normalizing the weights including normalizing the weights as a group including labels associated with areas of interest and areas of dis-interest to the user; and wherein propagating the weights further comprises propagating the weights based at least in part on the normalized weights.

55. The method of claim 54 further comprising:
  providing a second different graph of the user group that includes a plurality of nodes, one for each user and one for each label, including providing edges between nodes that represent an association of a label with a respective user; and
  determining weights for each label for each user node in the second different graph.

56. The method of claim 54 further comprising applying an algorithm iteratively to the first and/or second graphs to determine the weights.

57. The method of claim 54 further comprising performing a random walk from each node for which labels are to be weighted including performing a tally of labels found on the walk and associating the tallied labels in proportion based at least in part on the tally.

58. A system for propagating interest and disinterest labels among users, comprising:
  one or more memory elements; and
  one or more processors for executing instructions in memory for:
    a data structure generator for creating a graph that represents a social network, the graph including labels and user nodes associated with users of a social network system, the labels including one or more designators for specifying areas of interest and areas of disinterest for a respective user;
    a classification module for associating the labels with the user nodes, the labels including weights, wherein each weight reflects a magnitude of a contribution of an associated label to a characterization of the respective node;
    a node relationship/association module for joining user nodes with edges based on relationships among users, including bi-directional or uni-directional edges depending on types of relationships, including similarity and dissimilarity, including determining a measure of similarity between two users, wherein the measure of similarity includes a similarity score determined from user interests and disinterests associated with a respective user, wherein the similarity score is based at least in part on similarity or dissimilarity of the two users; and a label weight modifier module for modifying label weights associated with user nodes during propagation of label weights among user nodes, including propagation of labels for a respective node to other nodes that are related to the respective node by a relationship, including propagating labels in accordance with the determined measure of similarity, including, when propagating labels between two nodes that have been determined to be dissimilar based on the determined similarity score, propagating areas of interest of one node of the two nodes as being of disinterest to another node of the two nodes and areas of disinterest as being of interest to the another node, and normalizing the labels for both the areas of interest and the areas of disinterest as a group.

59. A computer program product tangibly embodied in a non-transitory computer-readable storage device and comprising instructions that, when executed by a processor, cause the processor to:

identify a set of labels to be associated with users of a social network including one or more designators for specifying areas of interest and areas of disinterest for a respective user;

label nodes comprising the user nodes with the labels;

determine that a user is similar or dissimilar to another user in the social network, including determining a measure of similarity between the user and the other user, wherein the measure of similarity includes a similarity score determined from user interests and disinterests associated with a respective user, wherein the similarity score is based at least in part on similarity or dissimilarity of the user and the other user;

assigning for each respective node, weights for the labels, the weights reflecting a magnitude of a contribution of an associated label to a characterization of the respective node; and propagating labels for a respective node to other nodes that are related to the respective node by a relationship including propagating labels in accordance with the determined measure of similarity including, when propagating labels between two nodes that have been determined to be dissimilar based on the determined similarity score, propagating areas of interest of one node of the two nodes as being of disinterest to another node of the two nodes and areas of disinterest as being of interest to the another node.

60. A computer program product tangibly embodied in a non-transitory computer-readable storage device and comprising instructions that, when executed by a processor, cause the processor to:

identify one or more labels of interest to be associated with users of a user group;

classify each user including determining an association between the one or more labels and each respective user wherein the labels include areas of interest and areas of dis-interest as either explicitly or implicitly determined for a given user;

provide a first graph of the user group that includes a plurality of nodes, one node for each user and one or more label nodes that inject weights for the labels into each respective user node, including providing edges between user nodes that represent relationships between the users and assigning labels to each user based on the classifying;

determine weights for each label for each user node in the first graph;

determine a measure of similarity between a user and another user, including determining that the user is similar or dissimilar to the other user in the social network; and propagate the weights to one or more neighbor nodes connected to a respective user node based at least in part on the determined measure of similarity including, when propagating labels between two nodes that have been determined to be dissimilar based on the determined similarity score, propagating areas of interest of one node of the two nodes as being of disinterest to another node of the two nodes and areas of disinterest as being of interest to the another node.

* * * * *